(12) United States Patent
Pchelnikov

(10) Patent No.: US 6,675,645 B1
(45) Date of Patent: Jan. 13, 2004

(54) ELECTROMAGNETIC METHOD OF AND APPARATUS FOR ELECTROMAGNETIC PARAMETERS OF MATERIAL (THIN FILMS AND BULKS) MONITORING

(75) Inventor: Yuriy N. Pchelnikov, Cary, NC (US)

(73) Assignee: MTS Systems Corporation, Eden Prairie, MN (US)

( * ) Notice: Subject to any disclaimer, the term of this patent is extended or adjusted under 35 U.S.C. 154(b) by 0 days.

(21) Appl. No.: 09/321,177

(22) Filed: May 27, 1999

Related U.S. Application Data

(63) Continuation-in-part of application No. 09/134,056, filed on Aug. 14, 1998.

(51) Int. Cl.[7] .............................. G01F 23/00; G01R 33/00
(52) U.S. Cl. .................... 73/290 R; 324/200; 324/228; 324/229
(58) Field of Search ................... 73/290 R; 324/200, 324/228, 229

(56) References Cited

U.S. PATENT DOCUMENTS 4,873,482 A  *  10/1989  Gray ........................ 324/71.4

* cited by examiner

Primary Examiner—Richard A. Moller
(74) Attorney, Agent, or Firm—David M. Ostfeld

(57) ABSTRACT

A device for measuring thin films and bulks is disclosed using slow-wave structures in electrodynamic elements to allow a decrease in frequency, an increase in sensitivity to electromagnetic parameters and accuracy of their monitoring. A method is also disclosed for monitoring of materials which includes placing an electrodynamic element near a monitored material and exciting an alternating electromagnetic field at an appropriate frequency to penetrate the monitored material concentrating in a small volume. Electromagnetic field parameters are then measured which are caused by the material parameters variation and said variations are converted to electromagnetic field parameters, the element being excited by an electromagnetic field in the form of at least one slowed electromagnetic wave.

47 Claims, 12 Drawing Sheets

ELECTROMAGNETIC METHOD OF AND APPARATUS FOR ELECTROMAGNETIC PARAMETERS OF MATERIAL (THIN FILMS AND BULKS) MONITORING

CROSS-REFERENCE TO RELATED APPLICATION

This is a continuation-in-part of U.S. patent application Ser. No. 09/134,056 filed Aug. 14, 1998, by Pchehnikov et al., for Electromagnetic Method of Liquid Level Monitoring.

FIELD OF THE INVENTION

The present invention relates to the non-contact monitoring of electromagnetic parameters of thin films and bulks (conducting and non-conducting materials). More specifically, the present invention relates to an electromagnetic method and apparatus for measuring resistivity, permeability and permittivity, including artificial dielectric permittivity. The monitoring of these parameters permits the measurement of thickness of semiconductor and dielectric films and substrates, by determining the distance to a buried layer or its conductivity. This provides the possibility of non-destructive monitoring of quality in the process.

BACKGROUND OF THE INVENTION

The usefulness of application of RF or microwave field for monitoring electric parameters of different materials is recognized by the prior art. Such devices can operate with microwave excitation. When a monitored material is placed in a microwave electromagnetic field, for example inside a circular cavity resonator, the resonance frequency and Q-factor are dependent on the material permittivity and resistivity, see U.S. Pat. No. 3,458,808 Apparatus for Measuring the Properties of a Material by Resonance Techniques/N. B. Agdur, 1969.

Permittivity of a dielectric material can be monitored when the material is placed in the transmission line, for example a waveguide. The phase delay of a microwave signal is used for permittivity measurement, see Adrian D. Green and Wayne S. Holmes, "Dielectric Properties of Fresh Peas at Frequencies from 130 MHz to 4 GHz." *Proceedings 31 Microwave Power Symposium*, 1996, Boston, Mass., pp. 1–4.

The electromagnetic method of measuring resistivity in semiconductor substrates is also known. Directed by a tapered parallel plate antenna, the microwave radiation reflects from the semiconductor wafer, the reflection factor correlating with a wafer's resistivity, see S. Bothra and J. M. Borrego "Spatially Resolved Resistivity Measurements in Semiconductor Wafers Using Microwave Techniques" *Proceedings of 20$^{th}$ European Conference Vol.* 1, 1990, pp. 990–994.

In particular, the state of the art is shown in Yu. N. Pchelnikov publications, disclosing a slow-wave structure application for permittivity measurement, see Yu. N. Pchelnikov "Possibility of Using a Cylindrical Helix To Monitor the Continuity of Media", *Measurement Techniques, Vol.* 38, # 10, 1995, pp. 1182–1184 and in the review on slow-wave structure-based sensors, see Yu. N. Pchel'nikov et al "Primary Measuring Transducers Based on Retardation Systems", *Measuring Techniques, Vol.* 37, # 5, 1994, pp. 506–510. These publications show that the change in the monitored parameters in the measuring volume leads to a change in signal phase delay in the slow-wave structure. A change in a delay alteration can be converted into a change in an oscillator's frequency.

Slowed electromagnetic waves and slow-wave structures are also well known in the field of microwave engineering, See Dean A. Watkins "Topics in Electromagnetic Theory", New York, John Wiley & Sons, Inc., p. 1, These waves are electromagnetic waves propagating in one direction with a phase velocity $v_p$ that is smaller than the light velocity c in a vacuum. The relation $c/v_p$ is named slowing or deceleration and is designated as n. In the most practically interesting cases, slowed electromagnetic waves are formed in slow-wave structures by coiling one or two conductors (for example, into a helix, as it is shown in FIG. 1 (Prior Art), where the other conductor is a cylinder), which increases the path length traveled by the wave, or by successively connecting resonant elements or cells, energy exchange between which delays the phase of the wave, or by using an electrodynamically dense medium (usually a dielectric), or a combination of these methods. Additional deceleration was also obtained due to positive electric and magnetic coupling in coupled slow-wave structures. See V. V. Annenkov, Yu. N. Pchelnikov "Sensitive Elements Based on Slow-Wave Structures" *Measurement Techniques, Vol.* 38, # 12, 1995, pp. 1369–1375.

Slow-wave structure-based sensitive elements are known in the art, see Yu. N. Pchelnikov, I. A. Uvarov and S. I. Ryabtsev "Instrument for Detecting Bubbles in a Flowing Liquid", *Measurement Techniques, Vol.* 22, # 5, 1979, pp. 559–560. Slowing of the electromagnetic wave leads to a reduction in the resonant dimensions of the sensitive elements, and this enables one, by using the advantages of electrodynamic sues to operate at relatively low frequencies, which are more convenient for generation and are more convenient for primary conversion of the information signal, but sufficiently high to provide high accuracy and high speed of response. The low electromagnetic losses at relatively low frequencies (a few to tens of megahertz) also help to increase the accuracy and sensativity of the measurements. The slowing of the electromagnetic wave leads also to energy concentration in the transverse and longitudinal directions which results in an increase in sensitivity, proportional to the slowing down factor n. See V. V. Annenkov, Yu. N. Pchelnikov "Sensitive Elements Based on Slow-Wave Structures" *Measurement Techniques, Vol.* 38, # 12, 1995, pp. 1369–1375.

Most slow-wave structures were made as two-conductor periodic transmission lines (see Dean A. Watkins "Topics in Electromagnetic Theory", John Willy & Sons, Inc. Publishers). A version is possible when a slow-wave structure contains three or more different conductors. In all cases the slowed wave is excited in the electrodynamic element between different combinations of the two conductors. The coiled conductors increasing the wave path are named "impedance conductors", and conductors with simple configuration such as rods, tapes, etc., stretched along the wave propagation direction are named "screen conductors", see V. V. Annenkov, Yu. N. Pchelnikov "Sensitive Elements Based on Slow-Wave Structures" *Measurement Techniques, Vol.* 38, # 12, 1995, pp. 1369–1375.

Both the prior art and the present invention measure one or more parameters of an electromagnetic field. Some of the prior methods and present invention use an electrodynamic element which is made as a section of an electromagnetic transmission line. The electrodynamic element is connected to an external RF or microwave signal generator which is used to excite an electromagnetic field. The change in, for example, resistivity, causes a shift in the characteristics of the electromagnetic field in the electrodynamic element. The shift in characteristics correlates to a change, for example, in the electromagnetic parameters of a monitored material. However, the prior art employs antennas, cavity resonators, wave-guides and two-conductor transmission lines.

Devices used in the prior art exhibit several problems overcome by the present invention. The previous design employs antennas, cavity resonators, wave-guides and two-conductor transmission lines. The monitoring by reflection and penetration factors measurement of the prior art requires very frequency, lying in particular, in a millimeter or an optical range, wherein measurements are possible only when optically transparent materials are involved. The electric parameters monitored by an electrodynamic element made as a section of a wave-guide in the prior art can not be made at relatively low frequency at which electromagnetic losses are small and the cost is also low. The previous methods that were based on wave-guide application are expensive, inconvenient and are not sufficiently accurate. The first is due to complexity of the microwave measuring circuits, the second is due to restricted volume inside the wave-guide; the third is due to radiation and electromagnetic losses in conductors, and due to cavity resonators' frequency dependence upon the environment temperature.

Thus, there is a need in the art for an electromagnetic method and apparatus for monitoring thin film and bulks electric parameters that is more convenient, has better sensitivity, better resolution, greater diversity and lower cost.

SUMMARY OF THE INVENTION

The present invention employs slow-wave structures in electrodynamic elements, which allows a decrease in frequency, an increase in sensitivity to electromagnetic parameters of materials for thin films and bulks and accuracy of their monitoring. The use of these structures is followed by the cost and dimensions of transducers decreasing, the range of measured parameters increasing, and the making of the measurements more convenient to obtain.

The frequency decreasing is achieved due to slowing. The sensitivity increasing is achieved due to electromagnetic energy concentration near the electrodynamic element surface and due to splitting electric and magnetic fields in the monitored volume. The additional increase of sensitivity is achieved due to application of the "butterfly" design of an electrodynamic element. The measured parameters range is widened due to the wide frequency band of slow-wave structures. The application convenience is due to possibility of placing of the electrodynamic element outside the monitored material. The slow-wave structure-based electrodynamic elements are designed, as a rule, on a dielectric base, stable to temperature alteration, and its resonant frequency dependence on temperature is very small, contrary to, for example, cavity resonators.

The present invention teaches an electromagnetic method of measuring electric parameters of thin films and bulks, both thickness and distance, that require high resolution wherein an excited electromagnetic wave with a preset distribution of the electric and magnetic components of the electromagnetic field makes it possible to increase the sensitivity and accuracy of measurement, using relatively low frequencies. The method is implemented in an apparatus, for example, for measuring resistivity, wherein the structural form of the electrodynamic element, used as the sensing element, allows increased sensitivity and accuracy. In this invention an electrodynamic element is made as at least one section of a slow-wave structure.

It is known, that dielectric or conducting materials, placed in the electromagnetic field, alters its parameters, for example, its velocity, that leads to the phase delay or resonant frequency alteration. The degree of such alteration and, therefore, sensitivity S is proportional to the relation of the volume V of a material to the monitored volume $V_0$, for example, a volume of a resonator, and depends on the electric and magnetic field distribution in the monitored volume $$S \sim (V/V_0) F(\in, \mu, \sigma) f,$$

where $\in$ and $\mu$ are relative permittivity and permeability, $\sigma$ is conductivity of a material, $F(\in, \mu, \sigma)$ is some function, depending on the material position in the monitored volume $V_0$, and f is frequency. See V. A. Viktorov, B. V. Lunkin and A. S. Sovlukov, "Radio-Wave measurements" *Moscow: Energoatomizdatat,* 1989, p. 27. If, for example, dielectric material is monitored, for the present invention, it should be placed in the electric field and its effect will be proportional to the electric field energy in the material. Since the resonant volume $V_0$ is smaller when the first resonant frequency $f_1$ is higher, the sensitivity S rises with frequency increasing. Slowing of electromagnetic wave n times leads to an n-times decrease of the resonant volume $V_0$ that is accomplished by the sensitivity n-times increasing $$S \sim (V/V_0) n F(\in, \mu, \sigma) f_1.$$

The sensitivity increasing permits lower frequency and works with smaller losses, which, for example, in conductors are proportional to the square root of frequency. See: E. C. Young "The Penguin Dictionary of Electronics", second edition, Penguin Books, p. 530. The decrease in electromagnetic losses leads to resolution increase.

The definition "thin film" means that film thickness is at least three times smaller than the depth of an electromagnetic field penetration into the film's material. It means that the electromagnetic field intensity does not change through the film's thickness by more than 30% of its value at the film's surface. In this case the film can be replaced by one or more surface electromagnetic parameters. If film is made from conducting material, it can be replaced by an infinitely thin film with an equivalent surface resistivity $\rho_\square$; if the film is made from a dielectric material, it can be replaced by an infinitely thin film with an equivalent surface permittivity $\in_\square$. The magnetic film can be replaced by an infinitely thin film with an equivalent permeability $\mu_\square$ see Yu. N. Pchelnikov "On the Application of Surface Permeability to the Analysis of Electrodynamic Systems"/*Journal of Communications Technology and Electronics, Vol.* 41, # 4, 1996, pp. 299–301.

The definition "bulk" means a three dimensional piece or volume of material. In some cases, when the bulk thickness exceeds the depth of the slowed field penetration in the material, the bulk can be replaced by an infinitely thin film with an equivalent surface permittivity, surface permeability or surface resistivity.

Thus, the slow-wave structures application makes it possible to measure thin films and bulks electromagnetic parameters (permittivity, permeability, and resistivity) with large sensitivity and higher accuracy than previous methods.

DESCRIPTIONS OF THE DRAWINGS

For further understanding of the nature and objects of the present invention, reference should be had to the following drawings in which like parts are given like reference numerals and wherein.

DETAILED DESCRIPTION OF THE PREFERRED EMBODIMENTS

Figure 1:
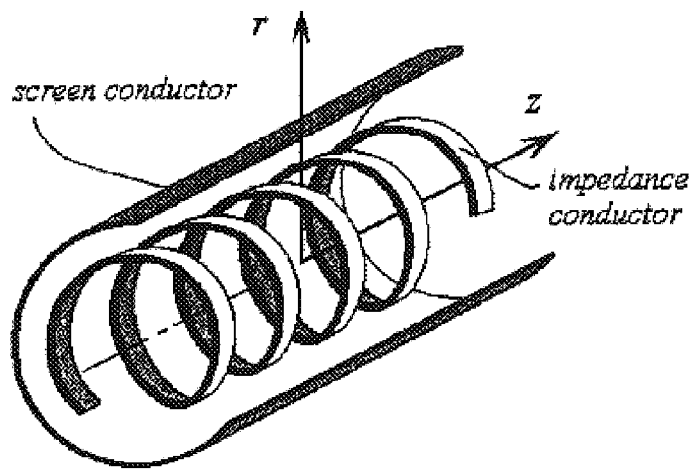
FIG. 1 illustrates a slow-wave structure of the prior art, wherein one conductor is coiled into a helix and the other conductor is a cylinder.
Figure 2:
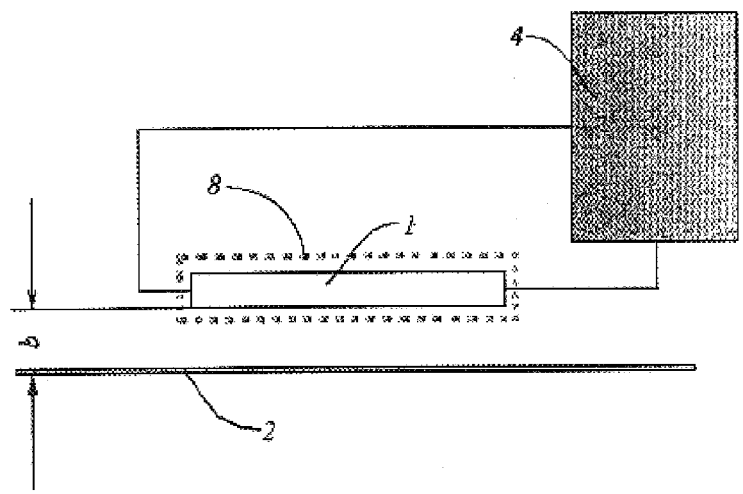
FIG. 2 illustrates an electrodynamic element of the preferred embodiments of the present invention juxtaposed with the film to be measured.
Figure 3:
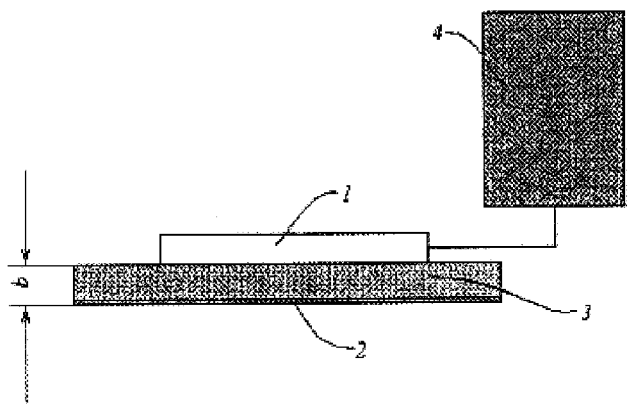
FIG. 3 illustrates an electrodynamic element of the preferred embodiment of the present invention mounted on the dielectric substrate adjacent the thin film.

As shown in FIGS. 2–3, an electrodynamic element 1 may be placed in parallel to a monitored material 2, opposite to the material 2 as shown in FIG. 2, or separated by a dielectric substrate 3, as shown in FIG. 3. Element 1 is connected to the measuring circuit 4, comprising (FIGS. 4 and 5) a generator 5 of electromagnetic oscillations at RF or microwave frequency, primary transducer 6, converting the electrodynamic parameters of electrodynamic element 1 into an electromagnetic informative signal, for example, resonance frequency, Q-factor, etc., and converter 7, converting electromagnetic informative signals into information about a film's electromagnetic parameter, for example permeability or thickness. Electrodynamic element 1 can be connected to the generator 5 in parallel (FIGS. 3, 4) or in sequence, as it is shown in FIGS. 2, 5.

In some cases, when electrodynamic element 1 is placed in an aggressive environment or in vacuum it can be installed in a case 8, shown in FIG. 2 by dotted lines, or can be covered by a dielectric layer (not shown in Figures).

At least one slowed electromagnetic wave is exited in the electrodynamic element 1 at a frequency at which the electromagnetic field penetrates into material 2. The material 2 can be represented by a thin film (FIG. 2), can be spread on the dielectric or semiconductor plate 3, as it is shown in the FIG. 3, or may have configuration of a bulk (not shown in Figures).

In all above mentioned cases the electromagnetic field excited in the electrodynamic element 1 penetrates into the monitored region, e.g. material 2. It means that the distance b between the electrodynamic element 1 and material 2 must not exceed the thickness δ of an "area of the energy concentration" which is approximately equal to $\lambda/2\pi n$, where $\lambda$ is a wave-length in the medium between the element 1 and film 2, n is slowing. In FIG. 2 it is the distance between element 1 and material 2; in FIG. 3 it is the substrate 3 thickness.

Figure 6:
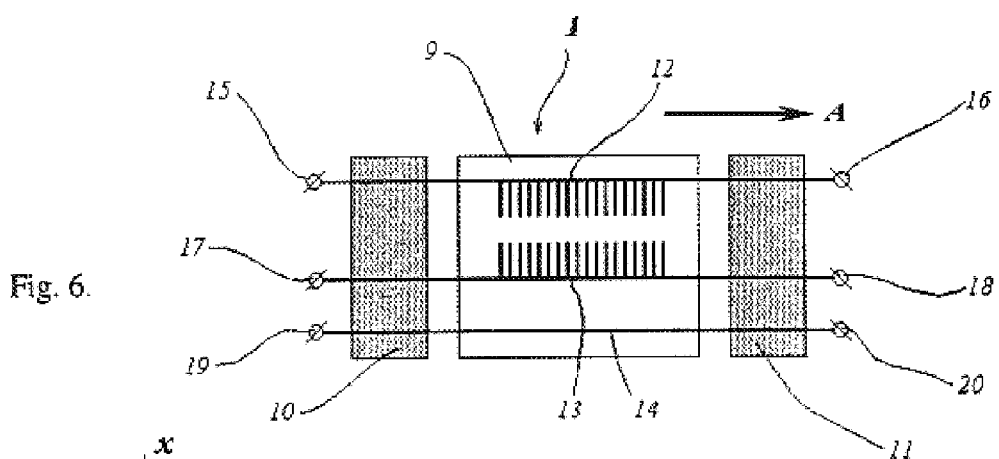
FIG. 6 is an illustration of the electrodynamic element of the preferred embodiment of the present invention.

The electrodynamic element 1 comprises slow-wave structure 9 (FIG. 6), one end of which is connected to the input 10 and the other end to the output 11, input 10 and output 11 also being included in the electrodynamic element 1. Depending on the quantity (number) of slow-wave structure 9 conductors (impedance conductors 12, 13 and a screen conductor 14, for example, in FIG. 6), the input 10 and the output 11 have two or more poles connected to slow-wave structure 9. For example, as it is shown in FIG. 6, the poles 15, 16 are connected to the opposite ends (input and output, respectively) of impedance conductor 12, and the poles 17, 18 (input and output, respectively) are connected to the opposite ends of the other impedance conductor 13; the poles 19, 20 (input and output, respectively) are connected to the opposite ends of the screen conductor 14.

One or more types of slowed waves at one frequency and much more at different frequencies can be excited in such electrodynamic element, simultaneously, their number being equal to the number of conductors minus 1. See Z. I. Taranenko, Ya. K. Trochimenko "Slow-Wave Structures" *Kiev,* 1965, p. 57.

The excited, slowed electromagnetic wave in the electrodynamic element 1 propagates along this element penetrating into monitored material 2. The latter having an effect on the propagation constant $\gamma$ and, as a result, on the slowing n and on the attenuation factor, that leads to alteration of electromagnetic parameters of the electrodynamic element 1, such as resonance frequency f and Q-factor.

Any electromagnetic wave is characterized by so called "wave coefficient", defining electric and magnetic fields E and H dependence on time t and coordinate z in the direction of wave propagation:

$$E, H \sim e^{j\omega t + \gamma z},$$

where $\omega$ is an angular frequency and, as mentioned above, $\gamma$ is a propagation constant, which can be presented by the expression $$\gamma = -j\beta - \alpha.$$

Here j is the imaginary unit, $\beta$ is the phase constant ($\beta = \omega/v_p$), $v_p$ is the phase velocity, $\alpha$ is the attenuation constant, related to the specific attenuation factor $K_a$ in decibels/meter by the relation $$K_a = 8.68\,\alpha.$$

See V. V. Annenkov, Yu. N. Pchelnikov "Sensitive Elements Based on Slow-Wave Structures" *Measurement Techniques, Vol.* 38, # 12, 1995, pp. 1369–1375.

The slowed electromagnetic wave is excited in electrodynamic element 1 with distribution of the electric and magnetic components of the field required for the best sensitivity. Usually, the field distribution is defined by the slowing n and the frequency f. Thus, when there is no boundary surface outside the impedance conductor, the longitudinal components of the electric field $E_z$ and the magnetic field $H_z$ of the wave are proportional to $e^{-x\tau'}$, $e^{-x\tau''}$ for a plane system (curves 21 and 22 in FIG. 7), and are proportional to modified Bessel functions $I_0(r\tau')$, $I_0(r\tau'')$ inside of a cylindrical slow-wave structure (curves 23, 24 in FIG. 8), or $K_0(r\tau')$, $K_0(r\tau'')$ outside it (curves 25, 26 in FIG. 8). Here x and r are the coordinates along the normal to the surfaces of the impedance conductors and $\tau'$, $\tau''$ are two different values of the transverse constant $\tau$, related to the different slowing values n', n" and the wave number k by the relations $$(\tau')^2 = k^2[(n')^2 - 1],$$

$$(\tau'')^2 = k^2[(n'')^2 - 1],\; k = \omega^2 \in_0 \mu_0,$$

where $\in_0$ and $\mu_0$ are the permittivity and the permeability of the vacuum, respectively. If the frequency changes and slowing n is constant, the wave number has different values, for example, k', k" that leads to transverse constant changing also $$(\tau')^2 = (k')^2(n^2 - 1),$$

$$(\tau'')^2 = (k'')^2(n^2 - 1).$$

It is seen from the above that the wave number k is proportional to the angular frequency $\omega$. If the frequency changes, the wave number also changes. The wave number alteration also leads to the transverse constant alteration. For two different frequencies one has two different wave numbers k', k". If slowing n is a constant, one has two different transverse constants $\tau'$, $\tau''$ for two different frequencies.

Figure 7:
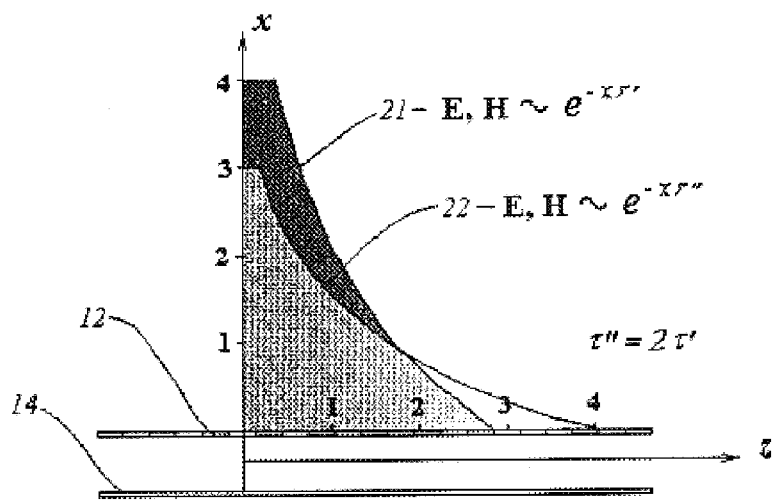
FIG. 7 is the graphic portrayal of the electric and magnetic fields near the plane slow-wave structure used with the preferred embodiment of the present invention.
Figure 8:
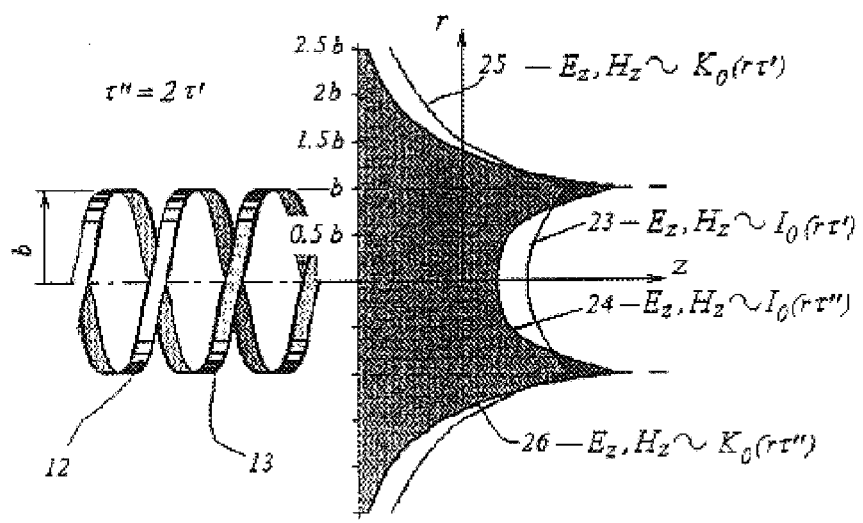
FIG. 8 is the graphic portrayal of the electric and magnetic fields inside and outside the cylindrical slow-wave structure with the preferred embodiment of the present invention.

In FIGS. 7 and 8 $\tau'' = 2\tau'$

It is seen from the expressions for $\tau'$, $\tau''$ and is shown in FIGS. 7 and 8, that a field distribution can be changed by a slowing n change, and by angular frequency $\omega$ change also. Thus, one can obtain different distribution of the field in the same electrodynamic element, exciting, for example, two or more slowed waves at different frequencies.

The field distribution can be changed by the different modes of the slowed wave exciting also. For example, the field distribution in FIG. 8 for bifilar helix was calculated for in-phase excitation. In this case the potentials of both helices are identical for diametrically opposite points. This means that the field components of an in-phase wave do not alter along the azimuth coordinate and are defined by the Bessel functions of the zero order. In case of anti-phase excitation the potentials of the helices have opposite signs and field distribution is defined by the Bessel functions of the first order, the field distribution being quite different from the distribution shown in FIG. 8.

One of the most important peculiarities of slowed waves is the electric and magnetic field energy splitting between electric and magnetic type waves (E- and H-modes, respectively). See Dean A. Watkins "Topics in Electromagnetic Theory", New York, John Wiley & Sons, Inc., p. 63. When the slowing n is sufficiently great, the energy of the electric field of the slowed wave is concentrated mainly in the E-mode, while the energy of magnetic field is concentrated mainly in the H-mode, both modes existing in the slowed wave only together. Because of this the electromagnetic parameters of the monitored material 2 (the conductivity, the permittivity, and the permeability) have a different effect on the E-modes and H-modes, thus manifesting their own kind of an anisotropy. See Yu. N. Pchel'nikov "Anisotropy of a Semiconductor Film in the Field of a Slow Wave", *Journal of Communications Technology and Electronics, Vol* 39, # 10, 1994, pp. 66–69. This effect is due to the absence of the longitudinal component of electric field in the H-mode and due to the absence of the longitudinal component of magnetic field in the E-mode wave, that follows from Maxwell's equations. See L. N. Loshakov and Yu. N. Pchel'nikov "Theory and the traveling-wave tube gain calculation", *Sov. radio:* 1964, p.p. 217–218.

It leads, for example, to the H-mode insensitivity to a longitudinal conductivity and permittivity and E-mode insensitivity to a transverse conductivity and permittivity. It follows also from Maxwell's equations that the electric energy of H-mode slowed wave and the magnetic energy of E-mode wave are smaller by factor of $n^2$ than electric and magnetic energy accordingly, where n is the considered wave slowing. This enables one, on the one hand, to make independent measurements, for example, of the electric permittivity and magnetic permeability, while on the other hand it enables one to control the distribution of the electric and magnetic fields across the transverse section of the electrodynamic element 1. Thus, screening by a screen conductor of the E-mode reduces the amount of the electric-field energy in the measured volume compared with the amount of the magnetic-field energy by more than a factor of $n^2$.

As mentioned above, slowing of the electromagnetic wave leads to electric and magnetic energy splitting between E- and H-waves. It follows from this, that the E-wave is not sensitive enough to permeability and the H-wave is not sensitive enough to permittivity of the material 2. This energy splitting makes the E-wave sensitive to small resistivity only, and makes H-wave sensitive to big resistivity only, see Yu. N. Pchel'nikov "Anisotropy of a Semiconductor Film in the Field of a Slow Wave"//*Journal of Communications Technology and Electronics, Vol.* 39, # 10, 1994, pp. 66–69.

Analyzing a slow-wave structure as being replaced by a long line with an equivalent inductance $L_0$ and an equivalent capacitance $C_0$, the first being proportional to the stored magnetic energy, the second being proportional to the stored electric energy, the slowing n in a long line is defined by formula $$n = \sqrt{L_0 C_0 / \epsilon_0 \mu_0},$$

see Yu. N. Pchelnikov "On the Replacement of Slow-Wave Systems by a Three-Conductor Equivalent Line" *Journal of Communications Technology and Electronics, Vol.* 39, # 3, 1994, pp. 68–74. It follows from this that a magnetic material would increase inductance, a dielectric material would increase capacitance, and both of these would increase the slowing n. The relatively big resistivity screens electric field, increasing capacitance C, and does not change the inductance L. The relatively small resistivity screens electric and magnetic fields, decreasing inductance L, and does not changes capacitance, the capacitance being maximum. To obtain maximum sensitivity one must shift electric or magnetic energy in the monitored material 2.

Figure 9:
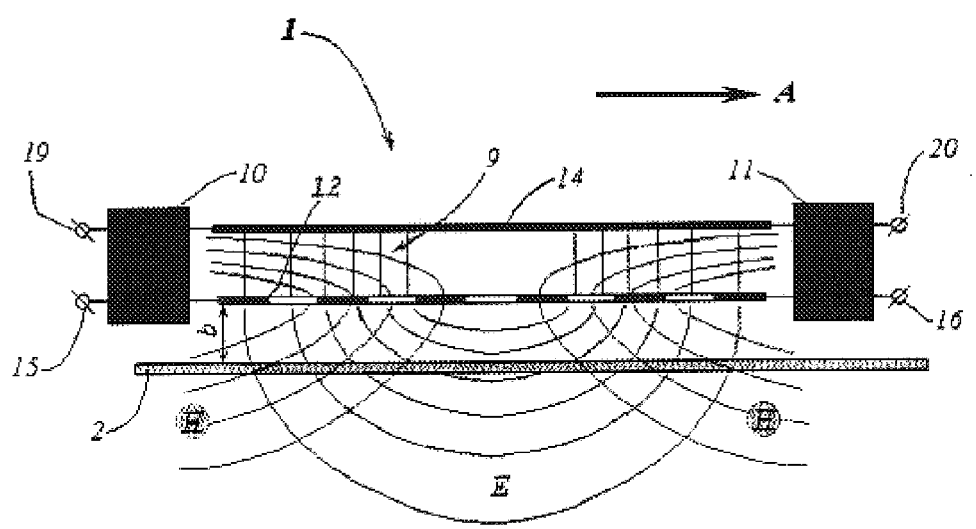
FIG. 9 shows an illustration of two-conductor slow-wave structure with an impedance conductor and screen conductor with the fields of a preferred embodiment of the present invention.

In the simplest cases, the distribution of electric and magnetic fields is as shown in FIGS. 7 and 8 and is formed, for example, by a two-conductor slow-wave structure 9 with an impedance conductor 12 and a screen conductor 14 (FIG. 9). Here an electric (E) field and a magnetic (H) field are distributed between conductors 12, 14 and outside the impedance conductor 12.

Figure 10:
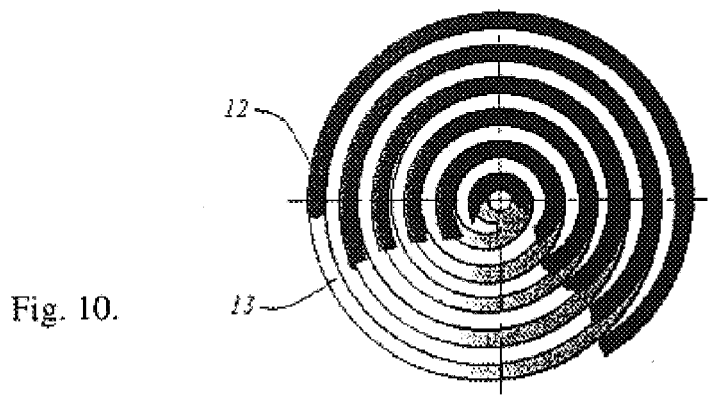
FIG. 10 illustrates a two-conductor slow-wave structure with impedance conductors showing opposite directed radial spirals in the fields of a preferred embodiment of the present invention.

The field distribution can be changed essentially in so called coupled slow-wave structures, which impedance conductors 12, 13 have configuration of turned through 180°, mirror images of one another, for example, oppositely directed radial spirals, shown in FIG. 10. Here the conductors 12, 13 are made as arithmetic spirals with opposite direction of winding. In such structures electric and magnetic energy can be split in transverse section of such structures, and this splitting can be controlled by exciting in-phase or anti-phase types of waves.

When exciting an in-phase type wave in the electrodynamic element 1 with two coupled impedance conductors 12, 13, connected one to another, and a screen conductor 14, the magnetic field energy is concentrated between conductor 12 and conductor 13 (FIG. 11), while an electric field energy is shied outside conductors 12, 13. This can be explained by the different directions of the transverse components of the currents in conductors 12, 13 and by equality of its potentials. The transverse components direction is perpendicular to the direction of the wave propagation.

In the second case (anti-phase excitation) the energy of the electric field is concentrated between impedance conductors 12, 13 (FIG. 12), while a magnetic field energy will be shifted outside conductors 12, 13. It can be explained by the transverse components of the currents in conductors 12, 13 directions coincidence and by the opposite potentials on the conductors 12, 13. In this case, if one wave is excited only, the screen conductor 14 can be absent. If both, anti-phase and in-phase waves should be excited, the electrodynamic element 1 should include impedance conductors 12, 13 and screen conductor 14.

Figure 11:
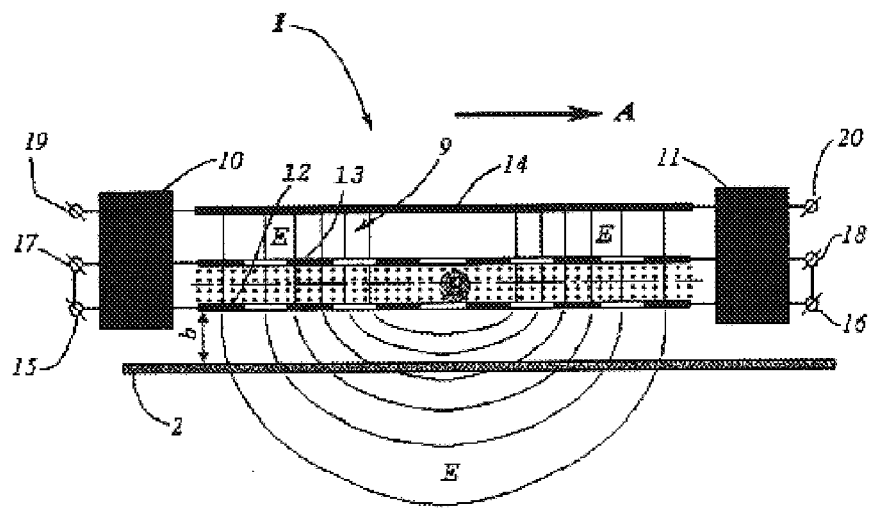
FIG. 11 illustrates the electric field concentration between conductors and electric field shifting outside conductors in an in-phase type wave in the electrodynamic element of the preferred embodiment of the present invention.
Figure 12:
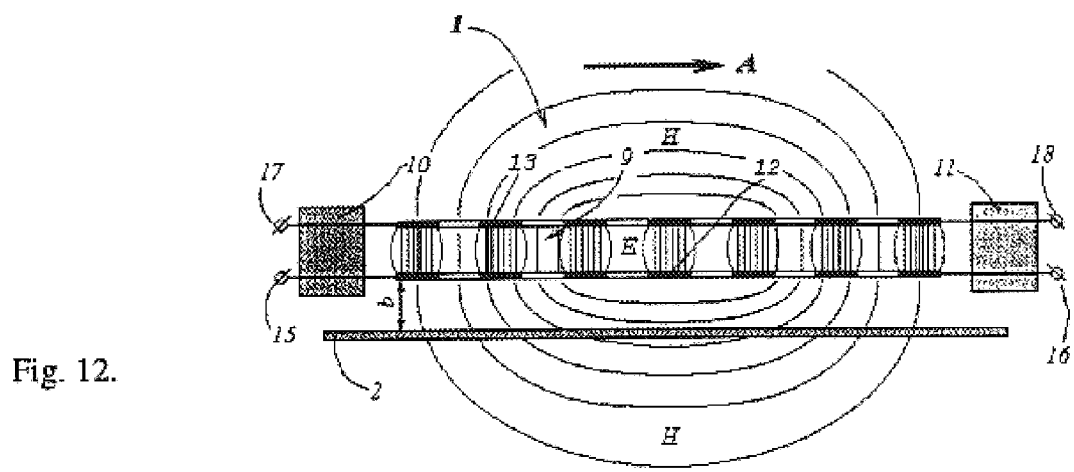
FIG. 12 illustrates an anti-phase type wave in the electrodynamic element of the preferred embodiment of the present invention.

The distribution of electric and magnetic components of a slowed electromagnetic wave excited in the electrodynamic element 1 must be chosen depending upon electric parameters of the math (film, bulk) 2 being monitored. As it was mentioned earlier, the dielectric material's effect is proportional to the electric energy concentration in the dielectric material 2. Thus, in the case of dielectric film 2 (non-conductive or poorly-conductive), the electric component of the slowed electromagnetic wave must be shifted into the monitored volume. If a material 2 has dielectric and ferrite properties simultaneously, for example it is ferrite, both electric and magnetic fields should be shifted in the monitored volume simultaneously or in two different electrodynamic elements 1. If the monitored material 2 is conducting, the magnetic field will effect oppositely to that of the electric field. Thus the magnetic field should be shifted from monitored volume, as it is shown in FIG. 11 or, alternatively, the electric field should be shifted from the monitored material 2, as it is shown in FIG. 12, depending on the material. For material 2 being conductive, the current induced on the metal surface by the magnetic field of the electrodynamic element 1 would increase this magnetic field in the region between electrodynamic element 1 and material 2.

If the electrodynamic element 1 is at least hexapole (FIG. 6), in-phase and anti-phase waves can be excited simultaneously, or one after another. It allows more informative parameters to be obtained. Two or more resonant frequencies can be utilized, which would permit obtaining two or more informative parameters. For example, if the material 2 is thin film to be monitored, the equivalent surface permittivity $\epsilon_\square$ is a multiple of the specific relative permittivity $\epsilon$ and material 2 thickness a.

$$\epsilon_\square = a \epsilon_0 \epsilon.$$

In the case of relatively thick material when the equivalent surface permittivity depends on field penetration in this material, the surface permittivity depends also upon the frequency $f_i$ $$\epsilon_{\square 1} = G(a, \epsilon_0 \epsilon, f_i),$$

where G is a function, which is the same for different frequencies, i.e. is frequency independent.

The influence of material 2 having equivalent surface permittivity $\epsilon_\square$ on a deceleration n and, as a result, on a resonant frequency $f_i$, depends, in its turn, on the frequency $f_i$ and the distance b between electrodynamic element 1 and the material 2. This influence is described by some function $F_i$ depending on a resonance number i or the type of the wave excited in electrodynamic element 1

$$f_i = F_i(\epsilon_{\square 1}, b), i=1, 2, 3 \ldots$$

If, for example, the distance b and thickness a are unknown but constant, having results of measurements of two different frequencies $f_1$ and $f_2$, one can exclude the distance b and thickness a from the equations $$f_1 = F_1(\epsilon_{\square 1}, b), f_2 = F_2(\epsilon_{\square 1}, b), \epsilon_{\square 1} = G(a, \epsilon_0 \epsilon, f_1), \epsilon_{\square 2} = G(a, \epsilon_0 \epsilon, f_2).$$

This makes it possible to calculate $\epsilon_{\square}$.

$\epsilon'_{\square}$, $\epsilon''_{\square}$ can then be calculated by having obtained two different measurements both the relative permittivity $\epsilon$ and the thickness a with help of the measurement results represented by the equations:

$$e'_{\square} = F(a, f_1, b),$$

$$\epsilon''_{\square} = F(a, f_2, b).$$

Analogously, if the thickness a is constant and the distance b changes, the distance b can be excluded from the two above-mentioned equations. The temperature and other parameters also can be excluded, the number of excluded influences being equal to the informative parameters number minus one. The number of informative parameters can be increased by exciting one or both types of waves at different frequencies, for example, at the first resonant frequency, second, etc.

In the mentioned example the distance b to a relatively well conducting film can be measured by the in phase wave, while the approximate value of the conductivity can be measured by the anti-phase wave. Comparing of the measured values allows the calculation of an accurate value of the conductivity.

As it was shown earlier, the degree of energy concentration near the electrodynamic element 1 depends on slowing down rate n, and frequency f, and increases as n and f increase. It is true for fields presented by the zero space harmonic. The same effect of energy concentration can be obtained by exciting an E- or H-mode wave, or both, with fields presented by the first (plus one and minus one) space harmonics. See Dean A. Watkins "Topics in Electromagnetic Theory", New York, John Wiley & Sons, Inc., p. 2, and Yu. N. Pchelnikov, V. T. Sviridov, "Microwave Electronics" Moscow: Radio-Svjaz, 1983, p. 44. For example, the distance b to a relatively well conducting material can be measured by the in-phase wave excitation, while the equivalent surface conductivity of the monitored material can be measured by the anti-phase wave excitation. When in-phase wave is excited, the conductivity $\sigma_{\square}$ of the monitored material 2 is large enough to increase the equivalent capacitance of the electrodynamic element 1 to its maximum value and its resonant frequency $f_1$ depends on the equivalent inductance L which decreases with the distance b $$f_1 = \Xi_1(b),$$

where $\Xi_1(b)$ is a function defined for in-phase wave. When an anti-phase wave is excited the electric field outside the electrodynamic element 1 is very small and the conductivity $\sigma_{\square}$ does not influence the equivalent capacitance changing the equivalent inductance L. In this case $$f_2 = \Xi_2(\sigma_{\square}, b),$$

where $\Xi_2(\sigma_{\square}, b)$ is a function defined for anti-phase wave. Solving $f_1 = \Xi_1(b)$ and $f_2 = \Xi_2(\sigma_{\square}, b)$ together, one can exclude the distance b and to obtain an equation which defines value of the conductivity $$\sigma_{\square} = \psi(f_1, f_2),$$

where $\psi(f_1, f_2)$ is function of measured frequencies $f_1$ and $f_2$. As it was said earlier, the degree of energy concentration near the electrodynamic element 1 depends on slowing down rate n, and frequency, and increases as n and f increase. Indeed, the energy of electric field $W^e$ concentration is proportional to the electric field intensity amplitude E squared, the energy of magnetic field $W^m$ is proportional to the magnetic field intensity amplitude H squared $$W^e = \epsilon \epsilon_0 E^2/4, \quad W^m = \mu \mu_0 H^2/4.$$

Here $\epsilon \epsilon_0$ and $\mu \mu_0$ are absolute permittivity and absolute permeability. With the field amplitudes being proportional to exp.($-\tau x$), the energy concentration is proportional to exp. ($-2\tau x$). It is true for fields presented by the zero space harmonic.

The same effect of energy concentration can be obtained by exciting an E- or H-mode wave, or both, with fields presented by the first (plus one and minus one) space harmonics. See Dean A. Watkins "Topics in Electromagnetic Theory", New York, John Wiley & Sons, Inc., p. 2, and Yu. N. Pchelnikov, V. T. Sviridov, "Microwave Electronics" Moscow: Radio-Svjaz, 1983, p. 44. In this case the energy density is proportional, for example, to exp.($-4\pi x/T$), where T is the period of a two stage slow-wave structure such as meander line or interdigital comb, or proportional to exp.($-2\pi x/T$), where T is period of a one stage slow-wave structure such as bifilar helix. As a rule, $2\pi x/T$, $4\pi x/T \gg 2\tau x$ and, as a result, the depth of the field penetration into the monitored volume (a thickness $\delta$ of the energy concentration area) is much smaller than in the case of zero space harmonic and is determined not by the frequency, the slowing, or the conductivity, as it is in the case of zero space harmonic, but it is determined by the period T of the slow-wave structure.

As it follows from the above, in the case of the first space harmonics, energy concentration near impedance conductors 12, 13 is greater than in case of zero space harmonic (the area of energy concentration $\delta$ is smaller). Such effect of the field concentration can be used at relatively low frequencies to increase sensitivity.

Figure 13:
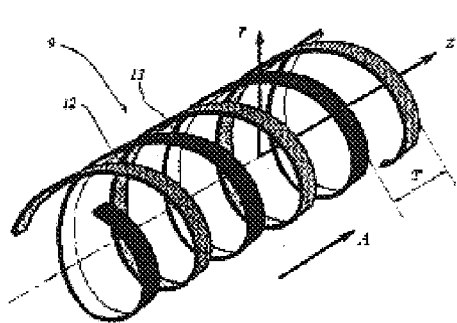
FIG. 13 shows a bifilar helix.
Figure 14:
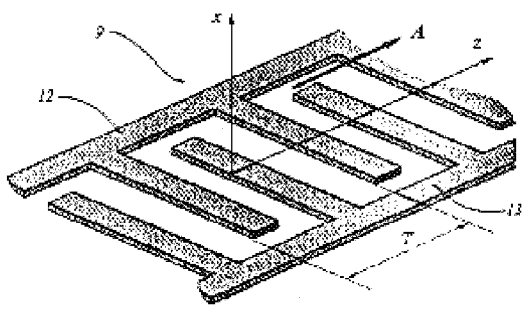
FIG. 14 illustrates interdigital combs.

With the phase constant $\beta$ for the first harmonics being approximately equal to $\pi/T$ for symmetrical structures, for example, bifilar helix with anti-phase excitation (FIG. 13) and being approximately equal to $2\pi/T$ for two-stage structures, for example, interdigital combs (FIG. 14) with slowing N defined as $\beta/k$, where $k=2\pi/\lambda$ ($\lambda$ is a wavelength in free space), one can find out that phase velocity of the first harmonics slowing is defined as $\lambda/T$ for two-stage structures or $\lambda/2T$ for symmetrical structures. Taking into account that sensitivity is proportional to the slowing value:

$$S \sim (V/V_0) \lambda/2TF(\epsilon, \mu, \sigma)f_1,$$

or $$S \sim (V/V_0) \lambda/TF(\epsilon, \mu, \sigma)f_1,$$

where $\lambda$ is a wavelength in the vacuum. Substituting $f_1 = c/\lambda$, where c is the velocity of the light in the vacuum, we obtain $$S \sim (V/V_0) c/2TF(\epsilon, \mu, \sigma),$$

or $S \sim (V/V_0) c/TF(\in, \mu, \sigma)$.

It is seen, that in the case of the first harmonics sensitivity S does not depend on frequency and increases with period T decreasing.

Figure 15:
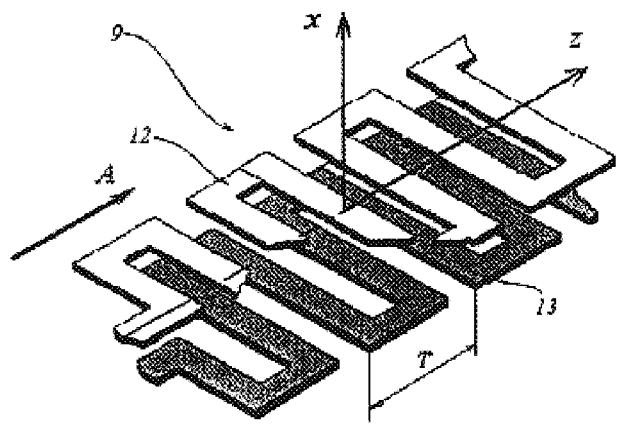
FIG. 15 illustrates coupled meander-lines of the preferred embodiment of the present invention.

In most cases slowed waves are so called hybrid waves, comprising both, E- and H-mode waves, and these waves can be presented by different space harmonics. For example, the E-mode in a meander-line (FIG. 15) is presented on the whole by the zero space harmonic, while the H-mode is presented by the first harmonics. The in-phase type wave in the bifilar helix (FIG. 13) comprises E- and H-modes, which are presented by zero space harmonic; the anti-phase type wave comprises the E- and H-modes both being presented by plus one/minus one harmonics.

Existence of a certain distance b between electrodynamic element 1 and the monitored material 2 decreases sensitivity S approximately by a factor of exp.(-bτ) because of the lowering of the electric and magnetic field strength, so that as b increases the ability to measure the monitored material 2 electric parameters decreases. Thus it appears that good sensitivity requires the distant b to be maintained relatively small and constant.

In the case of thin films monitoring the dependence of the propagation constant γ upon the distance b as it follows from an analysis for relatively large slowing (when n≈τ/k), may be small. The conditions required for such small dependence may be used for the decreasing of the distance b influence. The measuring error does not exceed 3% when the distance b alteration does not exceed 30% if $\in_\square < 0.3\lambda/2\pi n$ $\rho_\square > 126 n$ for E-wave and $\mu_\square < 0.3\lambda/2\pi n$ $\rho_\square 126/n,$ for H-wave, where λ is wavelength in free space, n is the wave slowing down in comparison to the velocity of fight in vacuum.

A variation in the material 2 electromagnetic parameters and thickness causes a variation of the propagation constant γ depending on the field distribution in the slowed electromagnetic wave. For example, dielectric and magnetic materials increase the imaginary part of the propagation constant γ, phase constant β; low conductive films increase the real part of the propagation constant γ attenuation constant α; highly conductive films decrease β and increase α.

Figure 16:
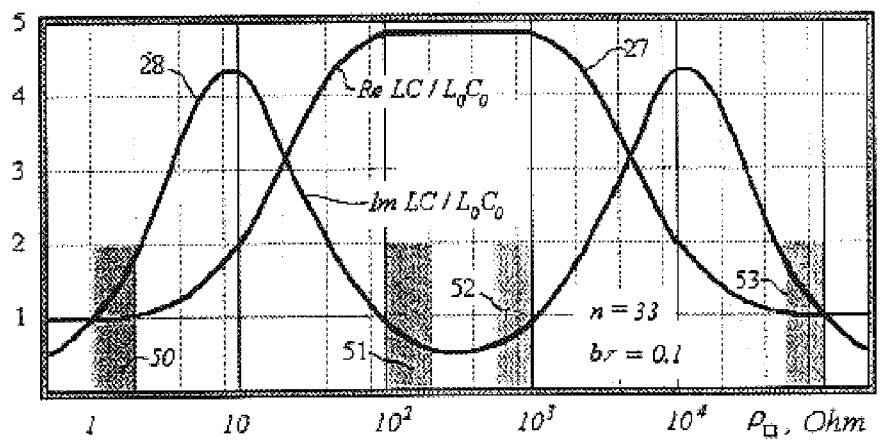
FIG. 16 illustrates the real component of phase ratios and imaginary part dependence upon a surface resistivity.

It follows from long line theory (see Yu. N. Pchelnikov "Comparative Evaluation of The Attenuation in Microwave elements"//Soviet Journal of Communications Technologies and Electronics, Vol. 32, # 11, 1987, pp. 74–78), that $\beta/\beta_0 = Re\sqrt{LC/L_0C_0},$ $\alpha/\beta_0 = Im\sqrt{LC/L_0C_0},$ where $\beta_0$ is a phase constant of the slowed wave and L, C are specific inductance and capacitance in the presence of monitored material 2. It is important that dependence of β and α are not monotonous and have maximums (the attenuation constant α has two maximums). It is seen from FIG. 16, where the curve 27 demonstrates a real part of $LC/L_0C_0$ dependence upon a surface resistivity $\rho_\square$ and the curve 28 demonstrates an imaginary part of $LC/L_0C_0$ dependence, calculated for slowing n=33 for the simplest design of electrodynamic element 1, when electric field and magnetic field in the monitored material 2 have equal intensity. Note that the ordinate of FIG. 16 is the relative values of real and imaginary of the phase constant shown in FIG. 16.

Figure 17:
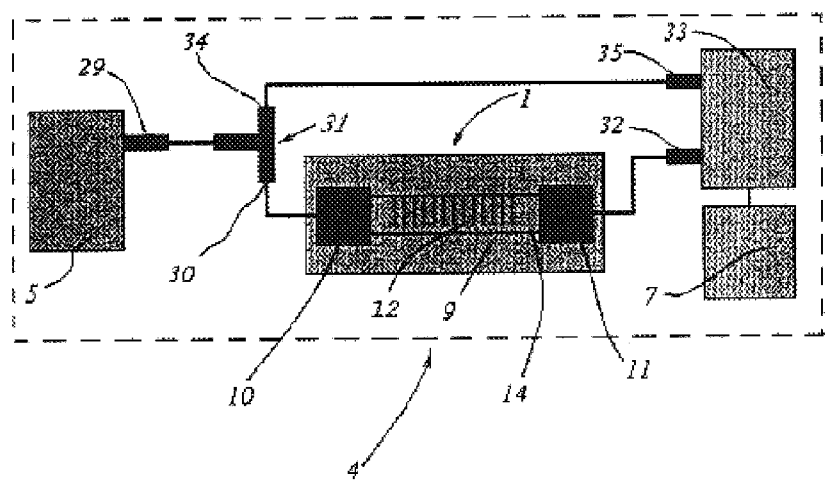
FIG. 17 illustrate the preferred circuit of the attenuation measurement of the preferred embodiment of the present invention.

The variation of the real part of the propagation constant γ is indicated by the attenuation of the slowed electromagnetic wave in the electrodynamic element 1. The preferred circuit of the attenuation measurement is shown in FIG. 17. Here the electromagnetic signal from the output 29 of the generator 5 (standard RF generator can be used) passes through the end 30 of the signal divider 31, input 10 of the electrodynamic element 1, slow-wave structure 9 and output 11, passes through the input 32 of a standard amplitude comparator 33 and is compared with the signal from the end 34 of the signal divider 31, connected to the input 35 of the comparator 33. The results of this comparison in voltage are converted into a material's 2 parameter by the converter 7, which can be standard voltmeter. Other measuring circuits can be used too.

Figure 18:
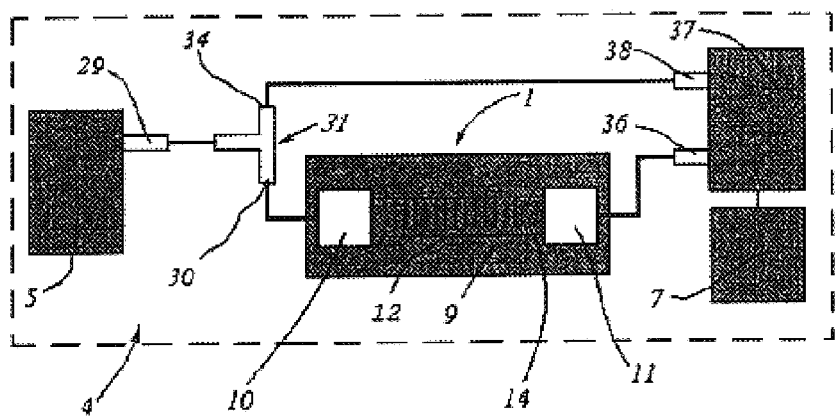
FIG. 18 illustrates the preferred circuit of the preferred embodiment of the present invention for phase delay measurement.

The variation of the imaginary part of the propagation constant γ is indicated by the phase delay measurement. The preferred circuit is shown in FIG. 18. Here the electromagnetic signal from output 29 of generator 5 passes through end 30 of the signal divider 31, input 10 of the electrodynamic element 1, slow-wave structure 9, output 11 and to input 36 of a standard phase comparator 37 with the voltage output, its phase being compared with phase of a signal coming to the input 38 of the comparator 37 from the end 34 of the signal divider 31. The results of this comparison in voltage are converted into a film's parameter by the converter 7, which can be a standard voltmeter. Other measuring circuits can be used also.

Figure 19:
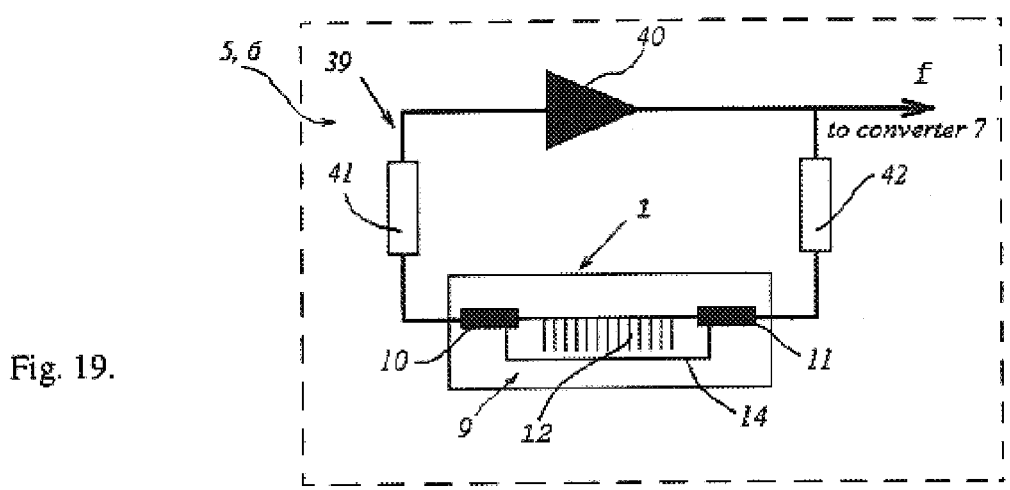
FIG. 19 illustrates the preferred circuit of the preferred embodiment of the present invention for variation of the phase delay converting into a generator's frequency alteration.

The variation of the phase delay can be also converted into generator 5 frequency alteration Δf. It can be done, for example, by the electrodynamic element 1 sequence inserting in the feedback network 39 of amplifier 40 (FIG. 19). Filter circuits 41 and 42 in feedback 39 can be inserted to increase stability of the generator 5. In this case the generator 5 takes part of the primary transducer 6 for use of measurement, converting a phase delay alteration into the frequency alteration.

The variation of the imaginary part of the propagation constant γ can be also indicated by the resonance frequency $f_i$ of the electrodynamic element 1 variation. If the slow-wave structure 9 is open ended (the output 11 is open), $f_i = c(2i-l)/(4b \cdot n),$ where c is the light velocity in the vacuum, i=1, 2, . . . is a resonant frequency number, l is the length of the slow-wave structure 9, n is a slowing down value.

Figure 20:
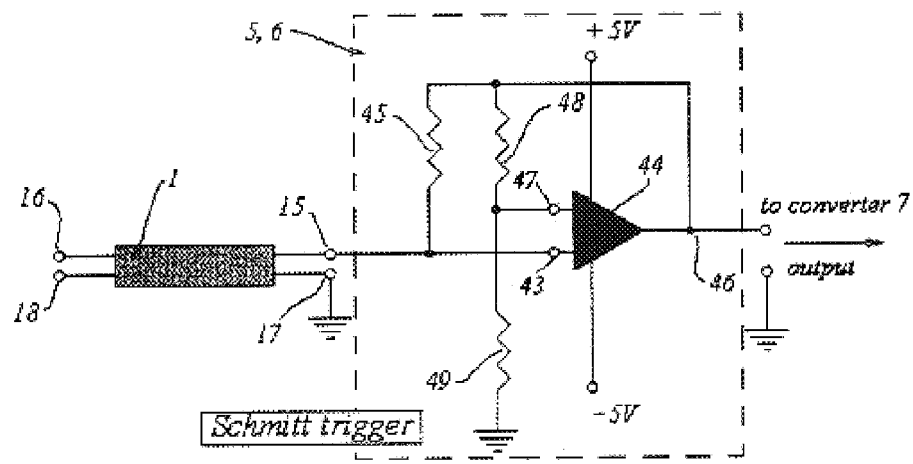
FIG. 20 illustrates the preferred circuit of the preferred embodiment of the present invention to convert alteration of resonant frequency into a generator's frequency.

If the slow-wave structure 9 is short ended (the end 11 is closed), then $f_i = ci/(2l \cdot n).$ The resonance frequency $f_i$ can be measured by standard net analyzer or by other devices. If electrodynamic element 1 includes a two-conductor slow-wave structure 9, for example a bifilar helix, the preferred circuit to convert alteration to resonant frequency as the informative parameter is very simple. It combines, as it was in the previous example, the generator 5 and transducer 6 (FIG. 20). In FIG. 20, the pole 15 of the electrodynamic element 1 is connected to the inverting input 43 of an operational amplifier 44; the other pole 17 is connected to the earth. (Alternatively pole 19 could be grounded to earth if the other conductor of the slow-wave structure 1 would be screen conductor 14). The poles 16, 18 can be open ended, short ended or terminated. It depends on the monitored material 2 electric parameters. For example, if it is dielectric or low conducting material, they can be open ended or terminated with a big inductance. Simultaneously, the inverting input 43 is connected through a resistance 45 to the output 46 of amplifier 44 and the non-inverting input 47 is connected through a resistance 48 to the output 46 and is connected through a resistance 49 to the earth, forming a Schmitt trigger (see E. C. Young *"The Penguin Dictionary of Electronics"*, second edition, p. 505). The signal from the output 46 has a meander configuration, with frequency near the resonance frequency of the electrodynamic element 1.

The analysis of the slow-wave structure with dielectric material shows that the slowing n growth with increases of surface permittivity and surface permeability reaches saturation, see Yu. N. Pchel'nikov, A. A. Elizarov "Ferrite Plate in the Decelerated Wave Field" *Radioelectronics and Communications ions Systems* (Iz. VUZ. *Radioelektronika*), Vol. 37, # 10, 1994, pp. 44–49. It is shown in this work that electromagnetic parameters of relatively thick plates can be described by equivalent surface parameters($\mu_\square$, $\in_\square$) Presume that saturation begins from the point on the monitored parameter if further increasing until infinity does not change the equivalent inductance L or equivalent capacitance C more than 10%. In this case, as it follows from the analysis, the saturation begins if $$\mu_\square > 10(cth b\tau - th b\tau)\lambda/2\pi n$$

or $$\in_\square > 10(cth b\tau - th b\tau)\lambda/2\pi n,$$

where cth and th are hyperbolic cotangent and tangent, respectively.

The analogous conditions can be obtained for resistive film. The slowing saturation in E-wave takes place when $$\rho_\square < 37.7 n/(cth b\tau - th b\tau)$$

and in H-wave when $$\rho_\square < 37.7/n(cth b\tau - th b\tau).$$

The same effect takes place if the material 2 electromagnetic parameters are too small and their influence on equivalent capacitance or equivalent inductance are very low. In this case it follows from the expressions for L and C that they do not exceed $L_0$, $C_0$ more than 10% if in E-wave $$\mu_\square < 0.1\lambda(1+th b\tau)/2\pi n(1-th b\tau),$$

or $$\in_\square < 0.1\lambda(1+th b\tau)/2\pi n(1-th b\tau),$$

or $$\rho_\square > 3.77 \cdot 10^3 n(1-th b\tau)/(1+th b\tau);$$

and in H-wave when $$\rho_\square > 3.77 \cdot 10^3(1-th b\tau)/n(1+th b\tau).$$

It is seen from FIG. 16, that in case of resistive film there are four regions of $LC/L_0C_0$ saturation, two of them for relatively small resistivity (region 50 for H-wave, and region 52 for E-wave) and two of them for relatively big resistivity (region 51 for H-wave and region 53 for E-wave). In the region 50 the film, having small resistivity, screens the electric and magnetic fields. As a result, the inductance L has its minimum value $L_{min}$ and capacitance C has its maximum value $C_{max}$. Any alteration of resistivity in this region doesn't change the inductance and capacitance. The further resistivity increasing is followed by the decreasing of the magnetic field screening and, hence, the inductance L increasing to its maximum value $L_0$, related to the beginning of the region 51. The capacitance C remains maximum till the resistivity values, related to the region 52 end. The further resistivity increasing leads to the capacitance C decreasing to its minimum value $C_0$, related to the region 53.

It is seen from FIG. 16 that when a resistive film is monitored, the imaginary part of LC measurement can be preferred if resistivity relates to regions 50, 51, 52 and 53.

It can be shown that in all the above mentioned measurements there are conditions required for obtaining maximum sensitivity. The most convenient for measuring estimation is so called relative sensitivity $S_r$, that in the case of slowing change can be defined as $$S_r = (\xi/n) \cdot (\partial n/\partial \xi),$$

where $\xi$ is the monitored parameter.

The magneto-dielectric plate in the slowed wave analysis shows: when the surface permittivity or permeability is monitored, the relative sensitivity is maximum if $$\in_\square = (1+th b\tau)\lambda/2\pi n,$$

or $$\mu_\square = (1+th b\tau)\lambda/2\pi n.$$

See Yu. N. Pchel'nikov, A. A. Elizarov "Ferrite Plate in the Decelerated Wave Field" *Radioelectronics and Communications Systems* (Iz. VUZ: *Radioelektronika*), Vol 37, # 10, 1994, pp. 44–49.

Figure 4:
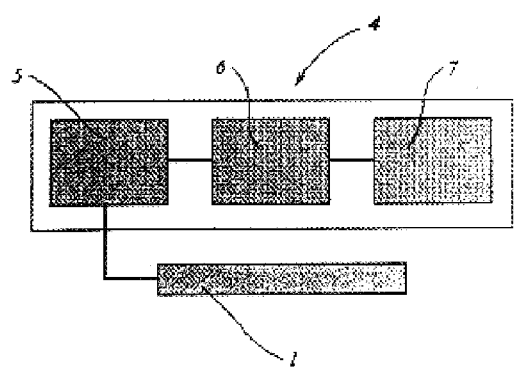
FIG. 4 illustrates a measuring circuit of the preferred embodiment of the present invention.
Figure 5:
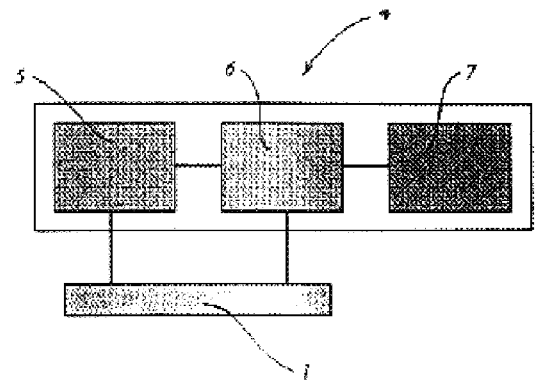
FIG. 5 illustrates a second preferred embodiment of the present invention showing the measuring circuit.

As is set out above, the apparatus for materials (films and bulks) electric parameters monitoring comprises an electrodynamic element 1, connected to a measuring circuit 4 (FIGS. 2–3), the last including a generator 5 of electromagnetic oscillations, a transducer 6, connected to a converter 7, converting an electric signal to indicate the measured parameters (FIGS. 4 and 5). Electrodynamic element 1 (FIG. 6) includes at least one slow-wave structure 9, input 10 and output 12, connected to the ends of the slow-wave structure 9. In some cases the output 11 can be absent, the conductors 12, 13, 14 being open or connected one to the other. The slow-wave structure 9 includes at least two conductors, which at least one is an impedance conductor, for example conductor 12, fashioned as a row of conducting members arranged in series in the direction of the slowed wave propagation (arrow A of FIG. 6) and connected to one another with spacing. The other conductors can be impedance conductor 13 and a screen conductor 14, made as a tape, plate, cylinder, etc. For example, impedance conductor 12 in FIG. 21 includes conducting fingers 54 connected one to another in the direction of arrow a in FIG. 21 by a conducting base 55 with gaps 56. The screen conductor 14 may be made as a conducting plate.

Also, as discussed above, slow-wave structure 9 can include two or more impedance conductors (12, 13 in FIG. 6) and, sometimes, one screen conductor 14. From one end of slow-wave structure 9, all its conductors are connected to the input 10, each to one pole, for example, impedance conductor 12 in FIG. 6 is connected to the pole 15, impedance conductor 13—to the pole 17 and the screen conductor 14—to the pole 19. From the other end of the slow-wave structure all its conductors are connected to the output 11, conductor 12—to the pole 16, conductor 13—to the pole 18, conductor 14—to the pole 20. The input 10 and output 11 can be standard coaxial adapters, or can be made from cable or wires. The output 11 can be absent.

Figure 22:
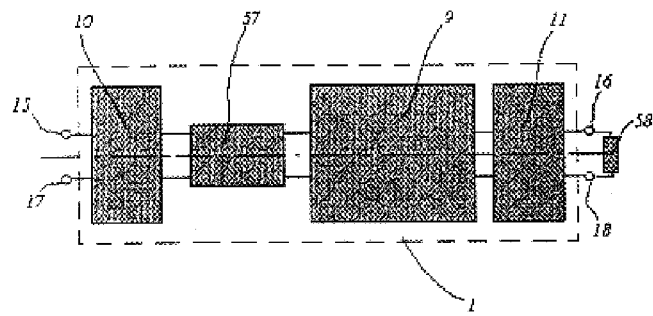
FIG. 22 illustrates an electrodynamic element including an additional slow-wave structure 57 and terminated to an inductor 58 having a large induction.

In some cases, when the distribution of electric or magnetic field along the slow-wave structure should be homogeneous, a section of slow-wave structure 57 described below (FIGS. 22, 25) should be added in series to the slow-wave structure 9. If the electrodynamic element 1 is open ended or terminated to an inductor 58 having big inductance, as it is shown in FIG. 22, the slow-wave structure 57 must have the wave impedance (characteristic impedance) $Z_1$ much bigger than the wave impede $Z_2$ of the slow-wave structure 9. If the electric length (a phase delay $\phi$) in both structures is the same (the preferred case), the first resonance frequency $f_1$ of the electrodynamic element 1 is defined by the expression (see Yu. N. Pchehnikov, A. A. Elizarov, "Quasiresonators Using Slowing Down Systems" *Radioelectronics and Communications Systems*, Vol. 34, # 10, 1991, pp. 68–72.)

$$f_1 = c\phi/2\pi n l, \quad \phi \approx \sqrt{Z_2/Z_1},$$

where c is the velocity of light in vacuum, l is the slow-wave structure 9 length, n is slowing in the slow-wave structure 9. In this case a distribution of the electric-field energy along slow-wave structure 9 is proportional to $$\cos^2 \beta z, \quad \phi \geq \beta z,$$

where $\beta$ is the phase constant in the slow-wave structure 9, z is the coordinate along the structure 9. Thus, if the phase delay $\phi$ is smaller 0.3 (that is $Z_1/Z_2$ is larger than 9), $$\cos^2 \beta z > 0.8.$$

This means the electric-field energy decrease along the electrodynamic element 1 is smaller than 20%.

Figure 23:
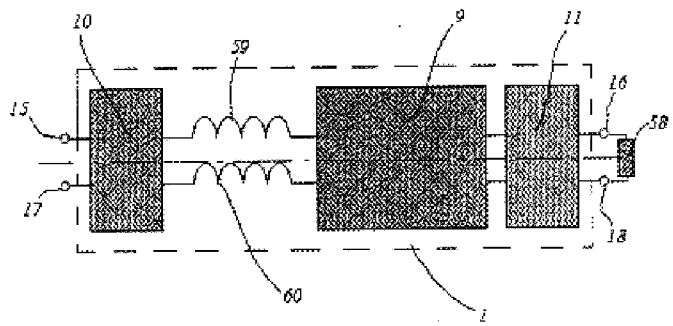
FIG. 23 illustrates an electrodynamic element wherein an additional slow-wave structure is replaced by two inductors.

In the case under consideration the additional slow-wave structure 57 can be replaced by two inductors 59, 60 with relatively small inductance $L_1$ and $L_2$. (FIG. 23). Though the preferable case is when $L_1 = L_2 = Z_2/\pi\phi$, and one inductor also can be used.

Figure 25:
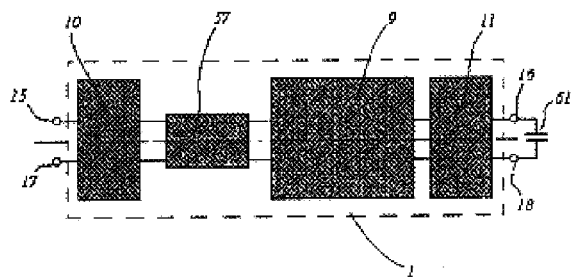
FIG. 25 illustrates an electrodynamic element with an additional slow-wave structure terminated to a capacitor.

If electrodynamic element 1 is short ended or terminated to a big capacitance 61, as it is shown in FIG. 25, and homogeneous distribution of the magnetic field energy along slow-wave structure 9 should he obtained, the wave resistance $Z_1$ of the additional slow-wave structure 57 must be chosen much smaller than the wave resistance $Z_2$ of the slow-wave structure 9. In this case, if a phase delay in both slow-wave structures is the same and equal to $\phi$, the magnetic field energy distribution along slow-wave structure 9 is proportional to $$\cos^2 \beta z$$

and $$\phi \approx \sqrt{Z_1/Z_2}.$$

Figure 24:
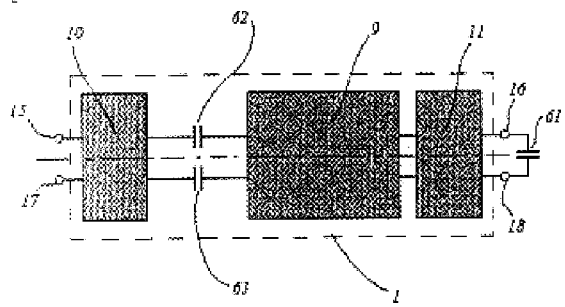
FIG. 24 illustrates an electrodynamic element wherein an additional slow-wave structure is replaced by two capacitors.

If $\phi < 0.3$, Than $\cos^2 \beta z < 0.8$ and the magnetic field distribution along the electrodynamic element 1 does not alter more than 20%. The additional slow-wave structure 57 can be replaced by two capacitors 62, 63 with relatively big capacitance $C_1$ and $C_2$ (FIG. 24). Though the preferable case is when $C_1 = C_2 = 1/Z_2 \pi \phi$, and one capacitor also can be used.

Figure 26:
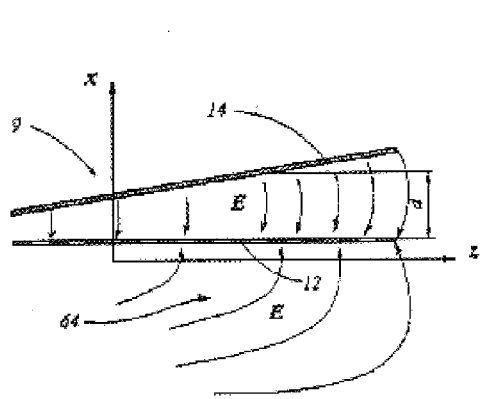
FIG. 26 illustrates varying the distance between conductors of a slow-wave structure.
Figure 27:
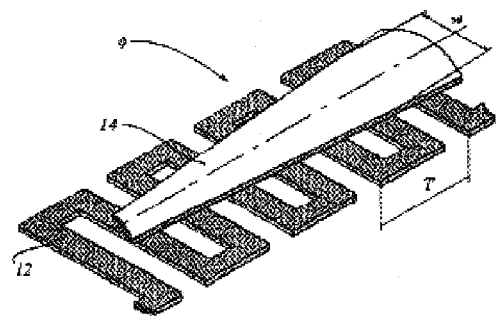
FIG. 27 illustrates a varying of a screen conductor width.

The energy distribution in the monitored volume can be adjusted also by the variation of the distance d between slow-wave structure 9 conductors, for example, between impedance conductor 12 and the screen conductor 14, as it is shown in FIG. 26. The increasing distance between conductors 12, 14 leads to the energy increasing in the area 64 outside the conductor 12. The same effect can be achieved by the conductor 14 width w altering along the structure 9, as it is shown in FIG. 27. The width decreasing as the distance increasing is accompanied by a screening decreasing.

Figure 21:
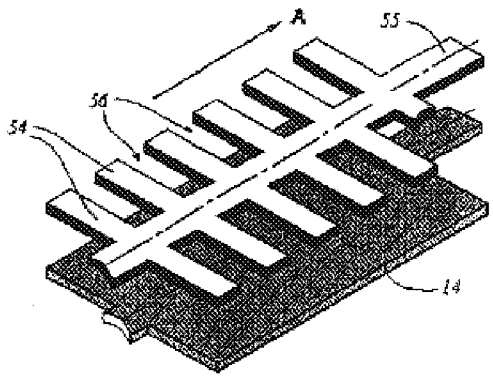
FIG. 21 illustrates a slow-wave structure with impedance and screen conductors.

Usually, impedance conductors 12, 13 of the slow-wave structure 9 have a constant period T, as it is shown in FIG. 21. The slowing n varies approximately in inverse proportion to T. Changing the slowing n one can change the energy concentration in the material 2, the last being approximately proportional to slowing n. It follows from this that the T variation along the slow-wave structure 9 can be used for the energy distribution adjustment.

Figure 28:
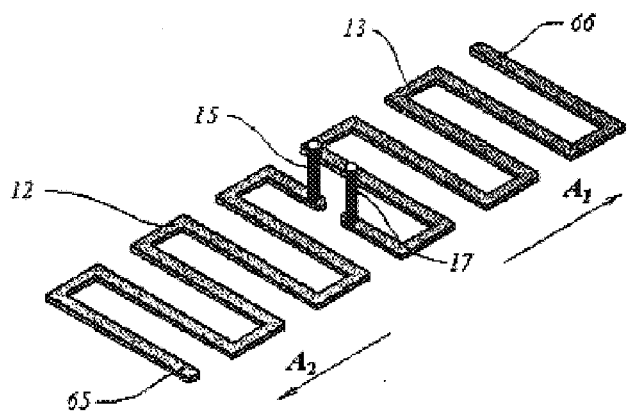
FIG. 28 illustrates a simple version of "butterfly" design of the electrodynamic element.
Figure 29:
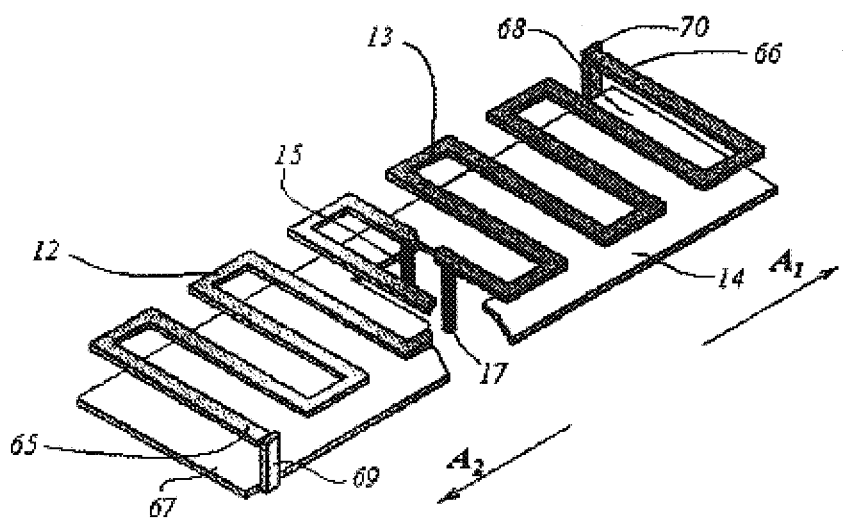
FIG. 29 illustrates the "butterfly" design of FIG. 28 with an additional conductor and having a different connections arrangement.

When electrodynanic element 1 is used as a quarter-wavelength resonator, the potential difference between element 1 and the monitored material is equal to ¼ of the potential difference between impedance conductors 12, 13 and ½ of the potential difference between the impedance conductor 12 or conductor 13 and the screen conductor 14. As a result the sensitivity decreases. This disadvantage can be eliminated in the "butterfly" design of electrodynamic element 1. The simplest version of such design is shown in FIG. 28, where the impedance conductors 12, 13 are placed on the same geometrical surface, for example plane, and directed in the opposite directions $A_1$ and $A_2$, as it shown in FIG. 28. In this case the electrodynamic element 1 has no output 11 and the ends 65, 66 of the impedance conductors 12, 13, opposite to that connected to poles 15, 17 of the input 10, can be free, as it is shown in FIG. 28, or connected to the ends 67, 68 of the screen conductor 14 by connectors 69, 70, as it is shown in FIG. 29.

Figure 30:
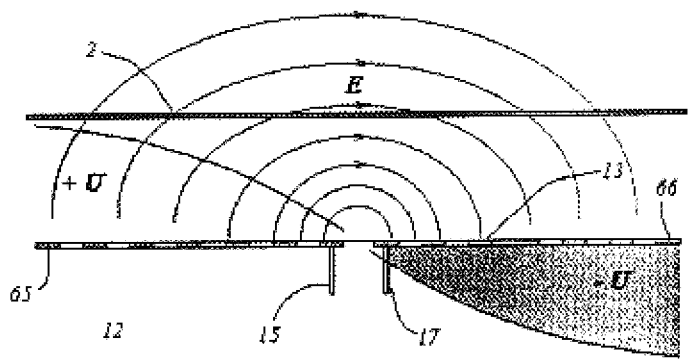
FIG. 30 shows an electric field distribution near a plane "butterfly" electrodynamic element.
Figure 31:
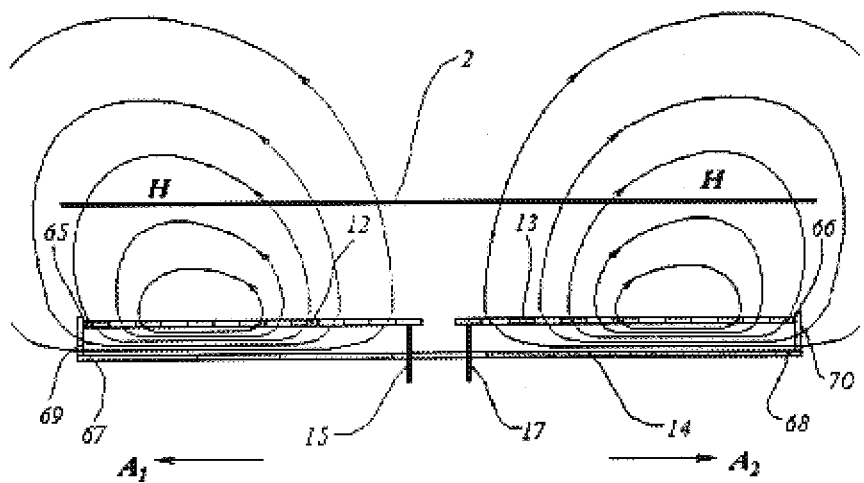
FIG. 31 shows a magnetic field distribution near a plane "butterfly" electrodynamic element.

The advantages of the "butterfly" design are:

The relatively homogeneous distribution of electric energy along the conductors 12, 13, if the ends 65, 66 are free (FIG. 30), and the relatively homogeneous distribution of magnetic energy, if ends 65, 66 are connected to ends 67, 68 of the screen conductor 14, respectively (FIG. 31). It can be explained by the increasing of potential difference in the directions of A1, A2, in the first case, and the magnetic field intensity, in the second case, simultaneously with increasing of the distance between corresponding points of the conductors 12, 13.

The potential of the monitored material 2 is equal to zero and, hence, the potential difference between element 1 and material 2 is equal to potential amplitude.

The screen conductor 14 can be eliminated, that leads to energy increasing in the material 2.

As it follows from the results of calculation and experiment, all of the above factors permit increasing sensitivity of the "butterfly" sensors by a factor of four.

Figure 32:
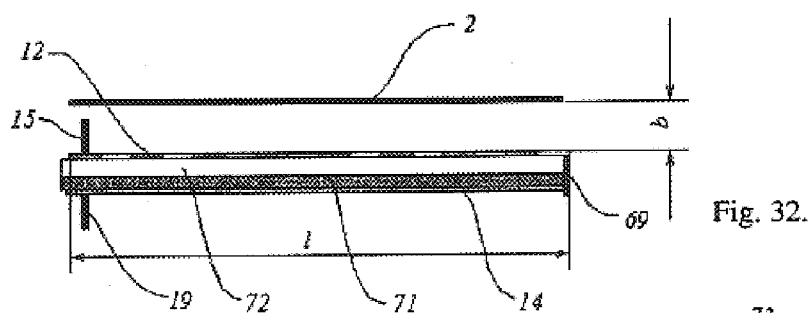
FIG. 32 illustrates the insertion of a magnetic screen diametrically opposite to the monitored film.

When permittivity or big resistivity is measured, the capacitance between the monitored material 2 and dance conductor 12 or conductor 13 or both conductors 12, 13 has the value of the same order as the equivalent capacitance $C_0$, and that makes it possible to achieve maximum sensitivity. When permeability is measured, the equivalent inductance of slow-wave structure $L_0$ can be increased only by a factor of two, which does not allow good sensitivity. To increase sensitivity of the permeability measurement, one can decrease magnetic resistance, inserting magnetic screen 71 symmetrically to the monitored material 2, for example, as it is shown in FIG. 32, where it is placed between the screen conductor 14 and the dielectric base 72, supporting the impedance conductor 12. If the magnetic screen 71 is made from non-conducting material, it can be used as a supporting base for slow-wave structure 9.

Figure 33:
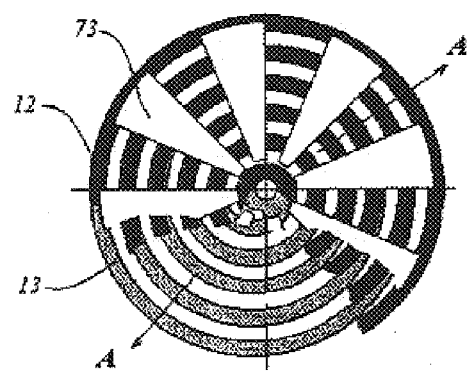
FIG. 33 illustrates a magnetic screen.

The magnetic screen 71 can be fashioned as a row of conducting tapes 73, arranged along the direction of the slowed wave propagation. In FIG. 33 tapes 73 are arranged along the coupled spirals' radii. In this case tapes 73 should be isolated one from the other and from spirals; for example, they can be installed on a dielectric film.

Figure 34:
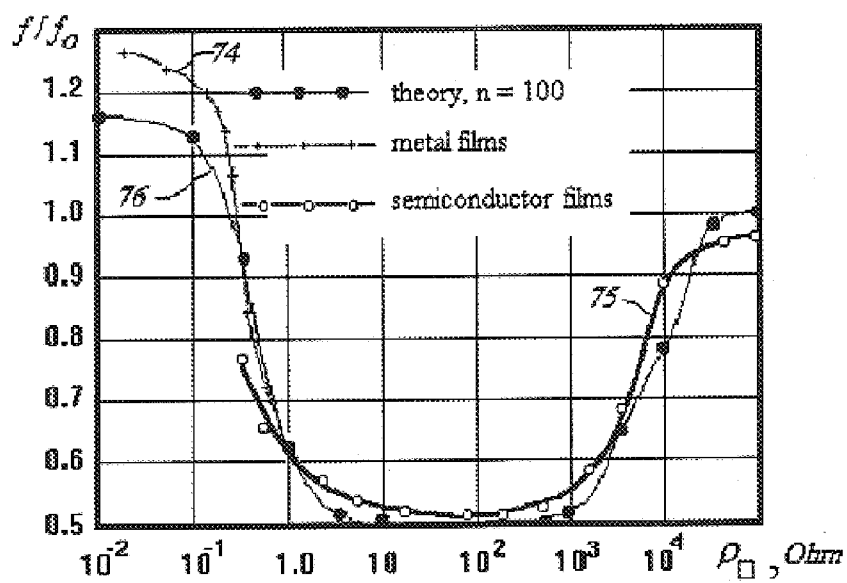
FIG. 34 is graph showing the dependence of normalized resonant frequency upon surface resistivity.

A typical set of curves in FIG. 34 shows dependence of a normalized resonant frequency $f/f_0$ upon surface resistivity $\rho_\square$, where $f_0$ is the resonant frequency of electrodynamic element 1 without monitored material 2. The curve 74 represents rests of measurements, carried out with help of coupled arithmetic spirals with slowing n≈500 for thin metal films on dielectric substrate. The curve 75 represents results of measurements, carried out with help of an arithmetic spiral with a screen conductor 14, made as a tape, for implanted semiconductor substrates. The slowing in the last case was much smaller (n≈50). The curve 76 in FIG. 34 demonstrates theoretical versus calculated for slowing n≈100.

Figure 35:
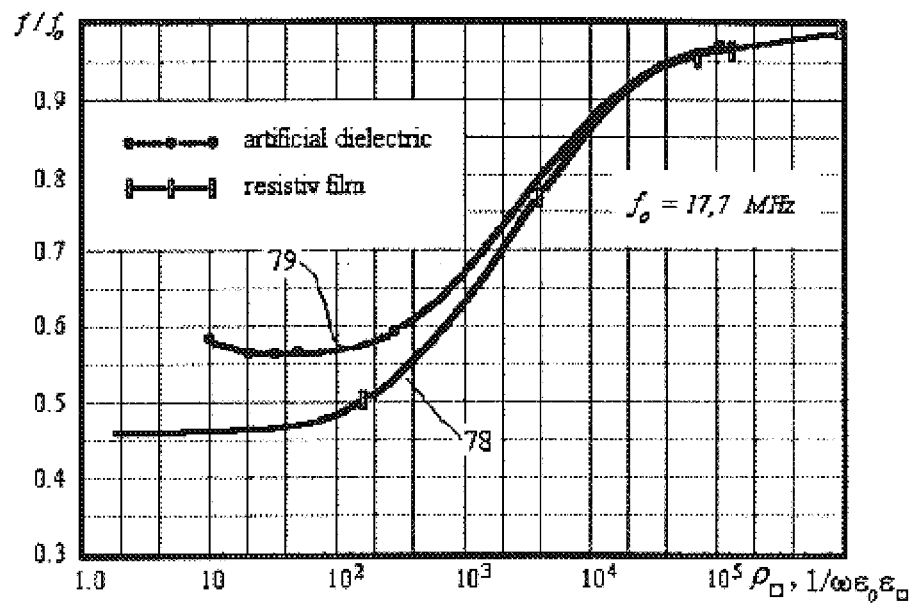
FIG. 35 illustrates typical characteristics for electromagnetic parameters of thin film monitoring.
Figure 36:
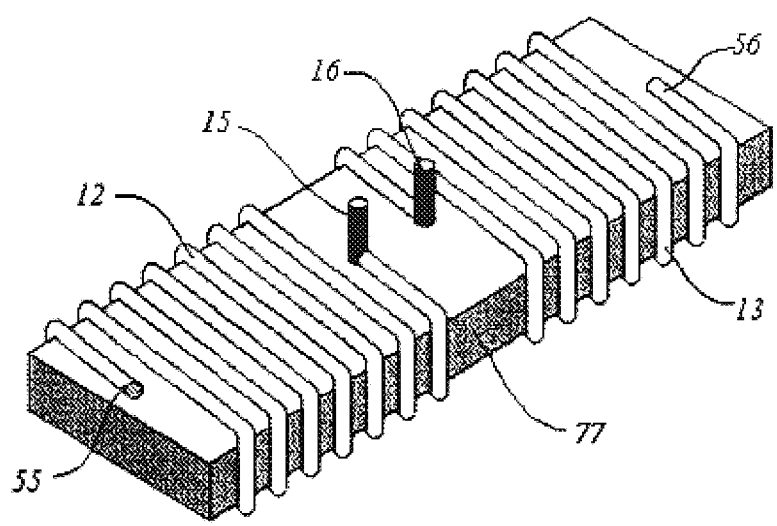
FIG. 36 illustrates an electrodynamic element with a slow-wave structure made from a rectangular helix wound on a dielectric base.

A typical characteristics of a transducer for electromagnetic parameters of thin films monitoring are shown in FIG. 35. This transducer comprises "butterfly" electrodynamic element 1 with slow-wave structure 9, made from rectangular helix (FIG. 36) and generator 5, made as Schmitt trigger (FIG. 20). The helical conductors 12, 13 are wound on dielectric plate 77 (FIG. 36). The curve 78 in FIG. 35 demonstrates the relative frequency $f/f_0$ of generator 5 dependence upon artificial dielectric equivalent impedance $1/\omega\epsilon_0\epsilon_\square$. Here, for comparison, curve 79 demonstrates frequency $f/f_0$ of generator 5 dependence upon surface resistivity $\rho_\square$.

Figure 37:
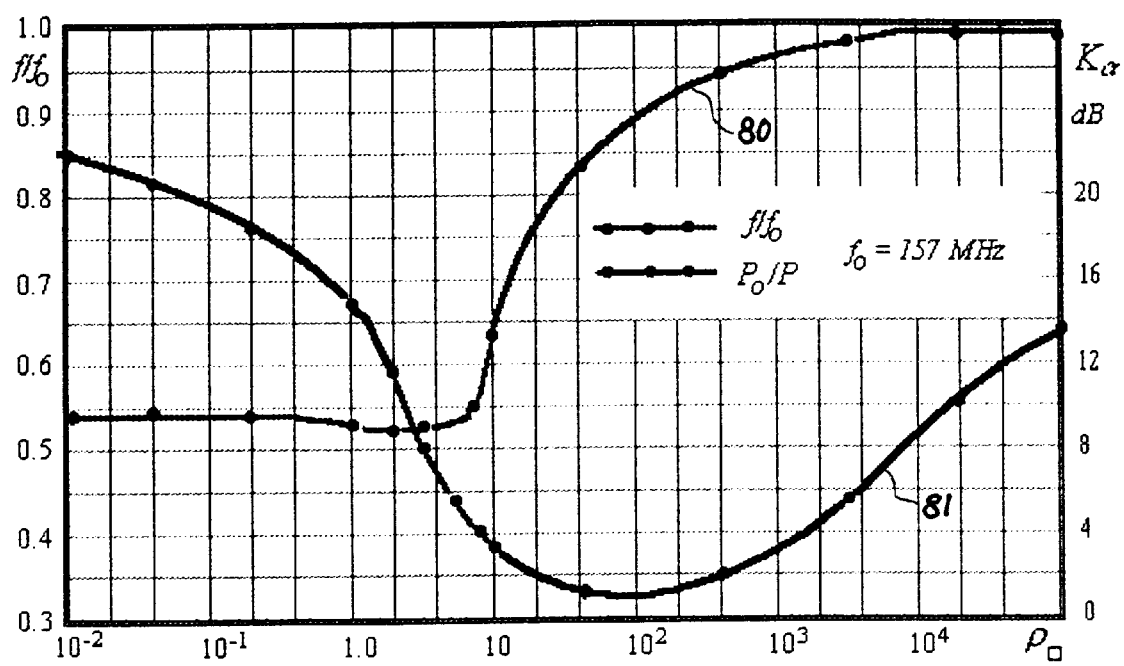
FIG. 37 illustrates typical characteristics of "butterfly" electrodynamic elements.

Typical characteristics of "butterfly" electrodynamic element 1 with conductors 12, 13 made as a meander lines and the conductor 14 made as one tape, are shown in FIG. 37. Here, curve 80 shows dependence of the element's 1 normalized resonance frequency $f/f_0$ of element 1 upon resistivity $\rho_\square$ of film 2. The curve 81 demonstrates the attenuation factor $K_a$ dependence upon the surface resistivity $\rho_\square$.

The experimental results, shown above and results of practical application show the simplicity of realization, large sensitivity, accuracy and usefulness of the invention.

The preferred embodiment of the invention is relative measurements of thin films' electromagnetic parameters.

All of the features of a particular preferred embodiment of the waveguide assembly are not shown in the above disclosure in order to emphasize the generality of the disclosure.

Because many varying and different embodiments may be made within the scope of the invention concept taught herein which may involve many modifications in the embodiments herein detailed in accordance with the descriptive requirements of the law, it is to be understood that the details herein are to be interpreted as illustrative and not in a limiting sense.

What is claimed is:

1. A method for monitoring one or more electromagnetic parameters of conducting and non-conducting, magnetic and non-magnetic materials, comprising:
    a. placing electrodynamic element near a monitored material;
    b. exciting in said element an alternating electromagnetic field at a frequency at which the electromagnetic field penetrates into the monitored material concentrating in a small volume;
    c. measuring the varation of at least one of the electromagnetic field parameters of the element, caused by the material parameters variation;
    d. said exciting of the element is by an electromagnetic field in the form of at least one slowed electromagnetic wave having suitable energy distribution of the electric and magnetic fields in the monitored material for measuring of the variation of the propagation constant converting of the electromagnetic waves propagation constant variation into the electromagnetic field parameters.

2. The method of claim 1, wherein the slowed electromagnetic wave includes an electric field shifted in the monitored material.

3. The method of claim 2 wherein the slowed electromagnetic wave is excited as an in-phase type wave.

4. The method of claim 1, wherein the slowed electromagnetic wave includes a magnetic field shifted in the monitored material.

5. The method of claim 4 wherein the slowed electromagnetic wave is excited as an anti-phase type wave.

6. The method of claim 1 wherein the electromagnetic field is excited in the form of at least two of said slowed electromagnetic waves; and
    a. said m of said variation is of the propagation constants of the electromagnetic waves being converted into electromagnetic field parameters, the number of parameters being equal to the number of the excited waves.

7. The method of claim 6 wherein the slowed electromagnetic waves are excited at different frequencies.

8. The method of claim 6 wherein at least one of the electromagnetic slowed waves is in-phase type wave and at least one of the electromagnetic slowed waves is anti-phase type wave.

9. The method of claim 6 wherein one of said measuring of variations of the propagation constants of one of the slowed waves is converted into a distance between the electrodynamic element and the monitored material.

10. The method of claim 6 wherein one of said measuring of variations of the propagation constants of one of the slowed waves is converted into a thickness of the monitored material.

11. The method of claim 6 wherein one of said measuring of variations of the propagation constants of one of the slowed waves is converted into temperature of the monitored material.

12. The method of claim 1 wherein the field of at least one of the slowed electromagnetic waves in the monitored material is set as a zero space harmonic.

13. The method of claim 1 wherein the field of at least one of the slowed electromagnetic waves in the monitored material is set as the plus and minus space harmonics.

14. The method of claim 1 wherein the field of one of the slowed electromagnetic waves in the monitored material is set as the plus and minus space harmonics while the field of another of the slowed electromagnetic c waves in the monitored material is set as the zero space harmonic.

15. The method of claim 1 wherein said measuring is of the variation of the real part of the propagation constant.

16. The method of claim 15 wherein the variation of the real part of the propagation constant is converted into the variation of the slowed wave attenuation in the electrodynamic element.

17. The method of claim 1 wherein said measuring is of the variation of the imaginary part of the propagation constant.

18. The method of claim 17 wherein the variation of the imaginary part of the propagation constant is converted into the phase delay variation in the electrodynamic element.

19. The method of claim 17 wherein said exciting is done by a generator and the variation of the imaginary part of the propagation constant is converted into the frequency of the generator variation.

20. The method of claim 17 wherein the variation of the imaginary part of the propagation constant is converted into resonance frequency of the electrodynamic element variation.

21. The method of claim 1 wherein the distance b between electrodynamic element and monitored material is chosen in accordance with condition:

$$b < c/2\pi f n,$$

where c is the light velocity in vacuum, f is frequency, n is slowing factor, $\pi = 3.14$.

22. The method of claim 21 wherein the surface permittivity $\in_\square$ of thin film is monitored, with a slowing n; and a distance b between the electrodynamic element and the monitored film, then for sensitivity the method is conducted under the following condition:

$$0.1(1+th\ bnk)/nk(1-th\ bnk) < \in_\square < 10(cth\ bnk - th\ bnk)/nk,$$

where k is the wave number in vacuum, defined as $k = 2\pi f/c$, f is frequency, c is the light velocity in vacuum, $\pi = 3.14$.

23. The method of claim 21 wherein the surface permeability $\mu_\square$ of thin film is monitored, with a slowing n, and a distance b between the electrodynamic element and the monitored film, then for sensitivity the method is conducted under the following condition:

$$0.1(1+th\ bnk)/nk(1-th\ bnk) < \mu_\square < 10(cth\ bnk - th\ bnk)/nk,$$

where k is the wave number in vacuum, defined as $k = 2\pi f/c$, f is frequency, c is the light velocity in vacuum, $\pi = 3.14$.

24. The method of claim 21 wherein the surface resistivity $\rho_\square$ of thin film is monitored, with a slowing n, and a distance b between the eletrodynamic element and the monitored film, then for sensitivity the method is conducted under the following conditions:

$$37.7n/(cth\ b\tau - th\ b\tau) < \rho_\square < 3.77 \cdot 10^3 n(1-th\ b\tau)/(1+th\ b\tau)$$

for E-wave, and according to condition $$37.7(1+th\ bnk)/n(1-th\ bnk) < \rho_\square < 37.7 \cdot 10^3/n(cth\ b\tau - th\ b\tau)$$

for H-wave, where k is the wave number in vacuum, defined as $k = 2\pi f/c$, f is frequency, c is the light velocity in vacuum, $\pi = 3.14$.

25. The method of claim 21 wherein the surface permittivity $\in_\square$ of thin film is monitored, with a distance b between the electrodynamic element and the monitored film and slowing n chosen in accordance with conditions $$\in_\square < 0.3/kn,\ bkn < 0.3,$$

where k is the wave number in vacuum, defined as $k = 2\pi f/c$, f is frequency, c is the light velocity in vacuum, $\pi = 3.14$.

26. The method of claim 21 wherein the surface permeability $\mu_\square$ of thin film is monitored, with a distance b between electrodynamic element and monitored film and slowing n chosen in accordance with conditions $$bkn < 0.3,\ \mu_\square < 0.3/kn,$$

where k is the wave number in vacuum, defined as $k = 2\pi f/c$, f is frequency, c is the light velocity in vacuum, $\pi = 3.14$.

27. The method of claim 21 wherein the resistivity $\rho_\square$ of thin film is monitored, with a distance b between the electrodynamic element and the monitored film and slowing n chosen in accordance with conditions $$\rho_\square > 1260n,\ bkn < 0.3$$

for E-wave and $$\rho_\square > 1260/n,\ bkn < 0.3,$$

for H-wave, where k is the wave number in vacuum, defined as $k = 2\pi f/c$, f is frequency, c is the light velocity in vacuum, or $\pi = 3.14$.

28. An apparatus for using an electromagnetic method for monitoring electric parameters of materials, comprising:

a. an electrodynamic element, connected to a measuring circuit, said element including at least a radio frequency generator, and a transducer of an electric signal into the electric parameters of reading of the material, wherein b. said electrodynamic element includes at least one input of RF signal and at least one section of a slow-wave structure to distribute the components of the electric and magnetic fields in the monitored material;

c. said slow-wave structure having at least two conductors, at least one of them being an impedance conductor, facing the monitored material and fashioned as a row of conducting members arranged in series in the direction of slowed wave propagation with period T and connected to one another with spacing.

29. The apparatus according to claims 28 wherein said slow-wave structure includes at least one magnetic screen, placed in parallel to said impedance conductors.

30. The apparatus according to claim 29 wherein said magnetic screen is fashioned as a row of conducting tapes placed along the direction of slowed wave propagation.

31. The apparatus according to claim 28 wherein said electrodynamic element forms a dipole, said slow-wave structure includes at least two identical impedance conductors, placed on the same geometric surface and directed in the opposite directions, the ends of said impedance conductors facing one another, and being connected to the input of said electrodynamic element.

32. The apparatus according to claim 28 wherein said electrodynamic element includes at least one additional slow-wave structure with wave impedance exceeding wave impedance of said first slow-wave structure.

33. The apparatus according to claim 28 wherein said electrodynamic element includes an additional slow-wave structure with wave impedance smaller than wave impedance of said first slow-wave structure.

34. The apparatus of claim 28 wherein said electrodynamic element includes at least one inductor.

35. The apparatus according to claim 28 wherein said electrodynamic element includes at least one capacitor.

36. The apparatus according to claim 28 wherein said slow-wave structure includes at least one screen conductor.

37. The apparatus according to claim 36 wherein said screen conductor includes at least one tape, placed along the direction of the slowed wave propagation.

38. The apparatus according to claim 28 wherein said period T of a row of conducting members alters along the slow-wave structure.

39. The apparatus according to claim 28 wherein the distance between said at least two conductors of said slow-wave structure alters along its length.

40. The apparatus according to claim 28 wherein the width of at least one of said conductors of said slow-wave structure alters along its length.

41. The apparatus according to claim 28 wherein at least one of said impedance conductors is at least a one-wire cylindrical helix.

42. The apparatus according to claim 28 wherein at least one of said impedance conductors being at least a one-wire radial spiral.

43. The apparatus according to claim 28 wherein at least one said impedance conductors being a meander line.

44. The apparatus according to claim 28 wherein at least one of said impedance conductors being a comb.

45. The apparatus according to claim 28 wherein at least two said impedance conductors are facing each other and being configured as mirror images of one another turned through 180°.

46. The apparatus according to claim 28 wherein at least two of said impedance conductors being identical and placed on the same surface one in the other.

47. The apparatus according to claim 28 wherein said conductors of said slow-wave structure being installed on a dielectric base, made from material with small electromagnetic losses and mall permittivity dependence upon temperature.

* * * * *